United States Patent [19]

Findley

[11] 4,031,519

[45] June 21, 1977

[54] PRINTER

[75] Inventor: Gerald I. Findley, Morgan Hill, Calif.

[73] Assignee: IBM Corporation, Armonk, N.Y.

[22] Filed: Nov. 11, 1974

[21] Appl. No.: 522,998

[52] U.S. Cl. .......................... 364/900; 340/324 R; 178/15; 178/30; 197/20

[51] Int. Cl.$^2$ ...................... G06F 3/12; G06F 7/34; G06F 13/00; G06K 15/02

[58] Field of Search ... 340/172.5, 173 LM, 324 AD, 340/324 A, 324 R, 324 M, 378 R, 146.3 D, 146.3 AH, 146.3 MA; 346/76 L; 354/5, 7, 8, 9; 178/6, 7, 4, 15, 25, 30; 331/94.5 K, 94.5 M; 332/7.51; 101/13, 93; 197/19, 20

[56] References Cited

UNITED STATES PATENTS

| | | | |
|---|---|---|---|
| 3,506,779 | 4/1970 | Brown et al. | 178/15 X |
| 3,622,701 | 11/1971 | Gardner | 178/30 |
| 3,624,607 | 11/1971 | Mita et al. | 340/146.3 AH |
| 3,634,828 | 1/1972 | Myers et al. | 340/172.5 |
| 3,676,852 | 7/1972 | Abernathy et al. | 340/172.5 |
| 3,688,033 | 8/1972 | Hell et al. | 178/15 X |
| 3,696,387 | 10/1972 | Nussbaum | 340/324 A |
| 3,701,972 | 10/1972 | Berkeley et al. | 340/172.5 |
| 3,701,999 | 10/1972 | Congleton et al. | 346/76 L |
| 3,729,714 | 4/1973 | Heard | 340/172.5 |
| 3,760,376 | 9/1973 | Tanner | 340/172.5 |
| 3,768,091 | 10/1973 | Naka | 340/324 AD |
| 3,786,429 | 1/1974 | Goldman et al. | 340/324 A |
| 3,815,094 | 6/1974 | Smith | 340/172.5 |
| 3,815,104 | 6/1974 | Goldman | 340/172.5 |
| 3,820,123 | 6/1974 | Ammann | 354/7 |
| 3,848,232 | 11/1974 | Leibler et al. | 340/172.5 |
| 3,864,697 | 2/1975 | Dillon et al. | 354/5 |
| 3,868,673 | 2/1975 | Mau et al. | 340/324 AD |
| 3,869,571 | 3/1975 | Delanie | 178/30 |
| 3,872,462 | 3/1975 | Lemelson | 340/324 A |
| 3,893,075 | 7/1975 | Orban et al. | 340/172.5 |
| 3,896,428 | 7/1975 | Williams | 340/324 AD |
| 3,955,189 | 5/1976 | Thompson | 178/15 X |

*Primary Examiner*—Gareth D. Shaw
*Assistant Examiner*—Jan E. Rhoads
*Attorney, Agent, or Firm*—Fraser and Bogucki

[57] ABSTRACT

A printer responds to channel commands including coded data received over a channel from a data processing unit by printing characters represented by the coded data using an electrophotographic printing arrangement. The coded data received by the printer is first translated into corresponding graphic codes or addresses by a translate table employing a predetermined translation code, following which the addresses are used to locate sets of character image bits stored within a plurality of character generator modules. Each set of character image bits is used to modulate a laser scan of a printing drum to effect printing of desired characters. Both the translate table and the character generator modules are program alterable, and the data stored therein can be loaded directly from or changed in response to data and instructions from the data processing unit. In addition the locations of the addresses stored in the translate table can be changed to accommodate a new code for the incoming data, and the same address can be stored in more than one location in the translate table so that the same character can be printed in response to different codes of the incoming data. New graphic characters to be added or substituted in the character generator modules are communicated over the channel in a form which includes a code identifying the particular character generator module and locations therein at which a set of character image bits is to be stored and graphic character data which is converted and reformatted into the desired set of character image bits. Pages of graphic codes can have minor changes made therein during printing to print multiple copies of various forms. Modification data for each copy and which is communicated to the printer from the data processing unit is employed, as necessary, to modify the graphic codes of each given page on a line-by-line basis, as each different copy of the page is printed.

36 Claims, 11 Drawing Figures

PRINTER

BACKGROUND OF THE INVENTION

1. Field of the Invention

The present invention relates to printers of the type which generate and print characters in response to communicated digitally encoded data.

2. History of the Prior Art

Printing has become an important if not essential part of many data processing operations. It is frequently necessary or desirable to be able to convert data within the system into recognizable characters or other indicia.

Accordingly printers have become common input-/output devices in many data processing systems. Typically one or more printers are coupled to the main channel of the computer or data processing unit along with a number of input/output devices of other types. Such systems include a provision for arranging and storing data and then using the data to generate the desired graphics by way of the printer. The arranging and storing of the data is frequently accomplished within the data processing unit itself using the central processing unit and the main storage. In such systems data to be printed is fed by the data processing unit over the main channel to the printer where the data is translated into graphics produced in printed form.

Printers can comprise several different basic types in terms of the apparatus used to perform the printing. Impact type printers are like typewriters in that they utilize the physical impact of a piece of type of other mechanical representation of the desired graphics on a printable medium such as paper. Ink jet printers modulate a jet of ink as the jet is scanned across the printable medium in raster fashion. Still other printers convert the data into the desired visible graphics by modulating a beam such as an electron beam or a light beam as the beam is scanned over a surface. Examples of printers of this type include those employing the well-known cathode ray tube in which modulation of the scanning electron beam produces the desired characters on the face of the tube.

While printers of the type described have experienced significant improvement and development over the years, such printers suffer from a number of serious limitations, particularly with respect to their versatility in processing and handling the data to be printed and in their ability to adapt to different codes for the data and different graphics to be printed. For example the typical impact printer utilizes character type set on a chain and is therefore limited in the number and variety of characters that can be printed. A change in character style may require disruption of the operation of the printer while a different print chain is obtained and installed. It is frequently necessary that the data to be printed be stored and formated or otherwise processed in the data processing unit so that the printer need only have the capability of translating each group of data being fed into the printer into the corresponding characters.

One example of a printer utilizing a cathode ray tube to provide the visible graphics is shown in U.S. Pat. No. 3,729,730, Sevilla et al., DISPLAY SYSTEM, Apr. 24, 1973. In the Sevilla et al system dot patterns for the various characters to be generated by the CRT are stored in the main storage of the data processing unit together with character codes identifying the various dot patterns. As a counter within the printer determines each new character position on the printable medium, an appropriate one of the character codes identifying the character to be printed in that space is routed through the counter and into the dot patterns to provide to the CRT a dot pattern which causes printing of the desired character.

The Sevilla et al. system provides some versatility in its use of stored dot patterns to generate the desired characters, and the desirability of making the character sets represented by the dot patterns program alterable is recognized. However, like many other systems, the system of Sevilla et al is dependent on the data processing unit for the formating, storage and other handling of the data. In addition to being limited in the characters sets available, such arrangements are also limited in the coding that can be used for the data.

A further example of a system using a CRT for character display is provided by U.S. Pat. No. 3,609,743, Lasoff et al., DISPLAY UNIT, Sept. 28, 1971. In the Lasoff et al. system data to be printed is generated gy a keyboard and loaded in a storage unit, from which the data is applied to a character generator storing sets of character bits used to produce the characters on the CRT. The data can also be provided to the storage unit by a data processing unit.

An example of a system in which paper is electrostatically charged, exposed to a CRT beam, and then coated with a toner to develop the characters is provided by U.S. Pat. No. 3,634,828, Myers et al., GRAPHICAL DATA PROCESSING APPARATUS, Jan. 11, 1972. In the Myers et al. system a data processing unit sends standard templates identifying the dots within a matrix to be printed together with address codes identifying the various standard templates to a tape drive, from which the standard templates and address codes are temporarily stored. The address codes are then used to convey the standard templates to the CRT of the copying apparatus for generation of the desired characters.

U.S. Pat. No. 3,701,999, Congleton et al., COMPUTER OUTPUT LASER MICROFORM RECORDING SYSTEM, Oct. 31, 1972, provides an example of a system in which a rotating mirror having plural faces is used to scan a modulated laser beam across a printable medium in the form of a length of microfilm. Binary coded characters from a data processing unit are stored in a recirculating memory, where they are circulated once for each horizontal scan of the laser beam and made available to a character generator which successively provides a series of waveform patterns corresponding to a horizontal slice of each of the characters. The horizontal slice is recorded during each of the horizontal scans by modulating the laser beam so as to effectively synthesize the characters in a row piecewise in a vertical direction.

Accordingly it is an object of the present invention to provide a printer which is versatile and has a wide range of capabilities.

It is a further object of the invention to provide a printer which is capable of handling many of the functions of processing and storage of the print data.

It is a still further object of the invention to provide a printer in which a variety of different character sets can be used and in which such character sets can be loaded or substituted directly from the data processing unit or computer under program control.

It is a still further object of the invention to provide a printer in which the code of the data to be printed can be readily changed, in which a variety of different codes can be used, and in which a plurality of different codes can be simultaneously used to provide among other things for the printing of common characters using different codes, all under program control.

It is a still further object of the invention to provide a printer in which a given page of data stored in the printer is easily modified as it is printed to produce minor changes therein, so that plural copies of the page can be printed with minor modifications.

BRIEF DESCRIPTION OF THE INVENTION

Printers in accordance with the invention contain character sets which are program alterable so that new character sets can be loaded directly into the printer from the data processing unit. The coded data representing the characters to be printed is translated into graphic codes in accordance with the code of the data. The graphic codes serve as addresses for the desired character sets which are then used to print the data. The particular code used to translate the data into graphic codes is itself program alterable and may be changed directly by the data processing unit to enable the printer to respond to various different codes for the data to be printed. Additionally a plurality of different codes can be used in the translation process, enabling a given graphic character set to be used by various different codes for the data. The printer is further capable of arranging, formating and storing large quantities of the data to be printed. Various buffers and related components assembly the incoming data into lines and then pages as the data is translated and then used to address the character sets. Data communicated by the data processing unit and stored in the printer is used to modify a page of data where multiple copies of the page are to be printed with minor modifications.

In a preferred embodiment of a printer according to the invention coded data representing characters to be printed are communicated over the main channel by the data processing unit to the printer input where they are received by a native channel within the printer and routed to an instruction execution unit. The instruction execution unit, which is coupled both to imaging apparatus for physically printing the characters and to a character generator which stores sets of character image bits for use in the copier, stores and the coded data together with commands from the main channel in a writable control storage contained therein. The instruction execution unit also stores microprograms designed to operate the printer in accordance with the particular requirements of the printer's user. The microprograms have eight prioritized levels with the microprogram routines in each level providing the necessary functions for the printer. The highest priority program is the channel program which receives channel command codes that are transmitted to the printer from the data processing unit. The lowest priority program executes the channel command codes. The other levels control the operation of the printer. The channel command codes control the processing of the coded data through the printer. The various commands, instructions and routines are carried out by the instruction execution unit in its various registers and arithmetic logic units.

The writable control storage and the read only storage within the instruction execution unit comprise a plurality of registers used to store and process the coded data through the printer. Character code bytes, each of which represents a character to be printed, are assembled into a line of print characters in an intermediate buffer. Each of the character code bytes is then translated by a translate table into a corresponding graphic code byte defining an address within one of four different writable character generator modules which store sets of character image bits. The graphic code bytes are then compressed in accordance with a compression algorithm and fed to a page buffer where they are assembled into at least one complete page of characters to be printed. The stored graphic code bytes are then decompressed prior to being fed to the writable character generator modules. The sets of character image bits within the writable character generator modules represent the portions of a character space which a particular character comprises and are used to modulate a laser beam within the imaging apparatus. As the modulated laser beam scans the electrophotographic surface of a print drum a discharge area is formed corresponding to the character to be printed. The discharged area is then coated with a toner and the toner is transferred onto a paper or other printable medium.

The writable character generator modules are program alterable in that the sets of character image bits may be loaded directly into the character generator modules from the data processing unit. In addition to communicating appropriate instruction for loading the bits, the data processing unit also communicates data comprised of character address bytes and character image data bytes. Each character address byte is translated so as to identify which one of the four different writable character generator modules a set of character image bits is to be stored in a as well as the particular one of 64 different character storage locations within the selected module where the set is to be stored. Conversion and format logic converts and reformats the character image data to provide the set of character image bits which is then stored in the addressed location within the writable character generator modules. In this way new character sets can be substituted or added in the character generator modules whenever desired. The printer's user is not limited to a particular set or sets of characters but is free to make up other characters at will.

The graphic code bytes stored in the translate table are also program alterable directly from the data processing unit. Since the graphic code bytes within the translate table determine the particular set of character image bits to be chosen in response to a particular character code byte and thus the graphic which is to be printed in response thereto, the translate table provides for considerable versatility in the various codes used. Thus by simply relocating the graphic code bytes within the translate table, the system can be made to respond to a different code for the incoming data. In addition the same graphic code byte can be stored in different locations within the translate table so as to be addressed by different character codes. In this manner the printer can be made to print the same character in response to different codes.

Graphic code bytes assembled into a page in the page buffer can be repeatedly used to print the same page with slight changes in the different copies. This feature, which greatly facilitates the printing of such items as multiple copy forms where the copies differ only slightly from one another, utilizes modification data transmitted by the data processing unit and stored in a modification data buffer. As each new line of the page is readied for entry into the character generator, parts of the modification data indicating the copy number, line number and print position of changes to be made in the page are compared with corresponding data from the printer, and changes are made where necessary by using new data from the modification data to replace the old data in the line to be printed. Where desired the new data can comprise one or more blank characters, resulting in the destruction of data in the corresponding parts of the line to be printed and thereby providing a deletion capability similar to spot or short carbon paper in multi-ply forms.

BRIEF DESCRIPTION OF THE DRAWINGS

The foregoing and other objects, features and advantages of the invention will be apparent from the following more particular description of a preferred embodiment of the invention, as illustrated in the accompanying drawings, in which.

DETAILED DESCRIPTION

Figure 1:
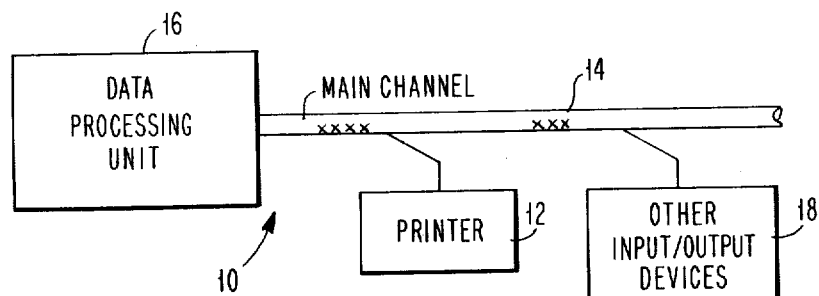
FIG. 1 is a basic block diagram showing the manner in which printers according to the invention are coupied to a data processing unit together with other input/output devices.

FIG. 1 illustrates a data processing system 10 which includes a printer 12 in accordance with the invention. The printer 12 is coupled to the main channel 14 of a data processing unit or computer 16. Other input/output devices 18 may be coupled to the main channel 14 or other channels in addition to the printer 12 and may comprise conventional input/output devices such as magnetic tape, disk or drum storage units, a keyboard console and a card read punch.

The data processing unit 16 typically comprises a main storage unit and a central processing unit (CPU). The main storage unit receives data and programs from input devices for storage therein and processing by the central processing unit. The data processing unit 16 may comprise any appropriate conventional unit such as the IBM System/360 or the IBM System/370. An example of such units is provided by U.S. Pat. 3,676,852, Abernathy et al., MULTIPLE PROGRAM DIGITAL COMPUTER, July 11, 1972. The Abernathy et al. patent discloses a programmed data processing unit having addressable storage, a central processing unit having one or more input/output devices connected with it, plural sets of program control registers for different program levels, and a switching mechanism for operating the central processing unit in the different program levels. The main channel 14 may assume any appropriate configuration such as shown, for example, by U.S. Pat. No. 3,680,054, Bunker et al., INPUT/OUTPUT CHANNEL, July 25, 1972. The Bunker et al. patent described the manner in which a main channel couples a plurality of input/output devices and their control units to a data processing unit.

Figure 2:
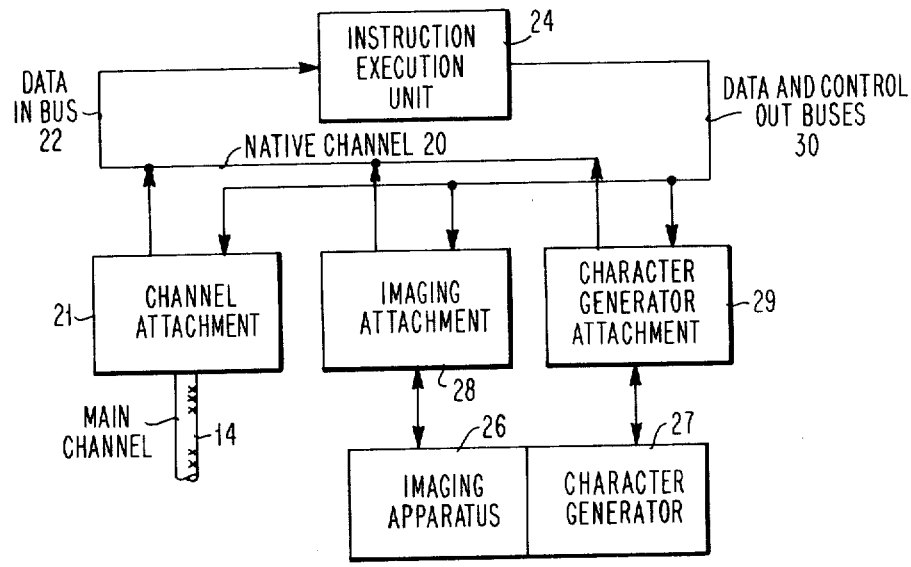
FIG. 2 is a block diagram of the basic components comprising the printer shown in FIG. 1.

FIG. 2 shows the basic arrangement of the printer 12 of FIG. 1 according to the invention. The printer 12 includes a native channel 20 coupled to the main channel 14 via a channel attachment 21 and providing appropriate interface between the main channel 14 and the printer 12. Data from the data processing unit 16 is communicated over the main channel 14 to the channel attachment 21 where it is carried by a data in bus 22 within the native channel 20 to an instruction execution unit (IEU) 24. The data in bus 22 also provides data to the instruction execution unit 24 from imaging apparatus 26 and a character generator 27. The imaging apparatus 26 is described hereafter as comprising apparatus responsive to a modulated laser scan for coating toner on the areas of a print drum discharge by the laser and transferring the toner onto paper, but may comprise any appropriate apparatus which prints the desired character graphics in response to the character data. The imaging apparatus 26 is coupled to the native channel 20 via an imaging attachment 28, and the character generator 27 is coupled to the native channel 20 via a character generator attachment 29. Data at the output of the instruction execution unit 24 is carried by data and control out buses 30 to the character generator 27, the imaging apparatus 26 and the native channel 20.

The instruction execution unit 24 stores the data from the data processing unit 16 and executes the instructions provided by the various microroutines of microprograms loaded by the printer's user from a flexible disk storage. The microprograms define 8 prioritized levels, during the last of which various commands from the main channel 14 are executed. Execution of the various microroutines initiates operation of the imaging apparatus 26, processes the data to be printed into an appropriate form for communication to the character generator 27, operates the character generator 27 to provide sets of character image bits corresponding to characters to be printed to the imaging apparatus 26, and operates the imaging apparatus 26 to effect printing of the desired characters.

The communications between the printer 12 and the data processing unit 16 are carried out in appropriate fashion as shown, for example, by U.S. Pat. No. 3,336,582, Beausoleil et al., INTERLOCKED COMMUNICATION SYSTEM, Aug. 15, 1967. The particular communication system described in Beausoleil et al connects input/output devices of differing data rates with a data processing unit. Data is transferred in both burst mode and multiplex mode. Operation occurs on an interlocked basis. with statements such as data, commands and status addresses initiating corresponding responses such as data, address or status from a connected device. U.S. Pat. No. 3,488,633, King et al., AUTOMATIC CHANNEL APPARATUS, Jan. 6, 1970, provides an example of the manner in which communications are carried out in a system of the type described in the Beausoleil et al. patent. An example of block multiplexing of data in the channel is provided by previously referred to U.S. Pat. No. 3,676,852 of Abernathy et al.

Figure 3:
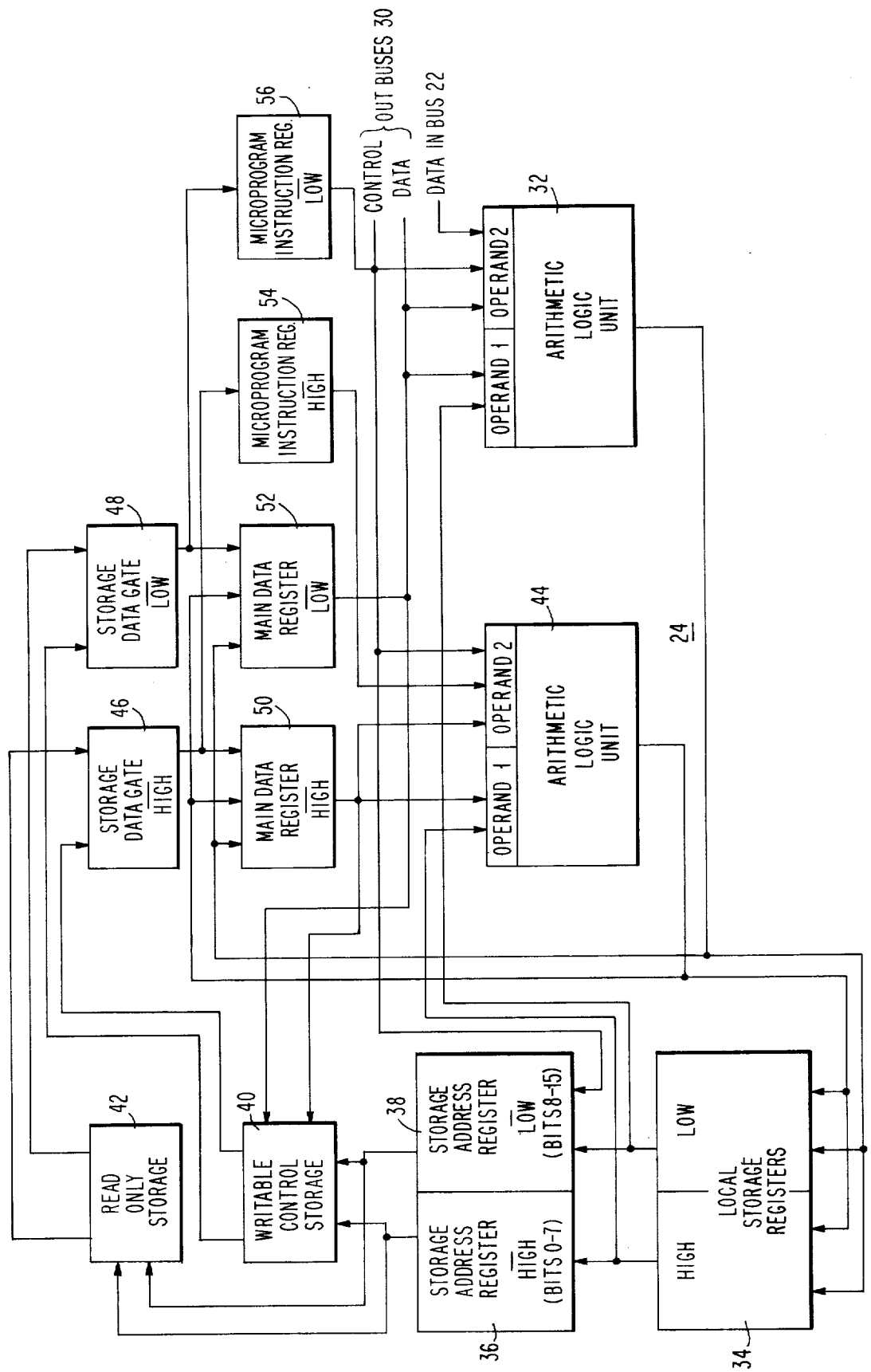
FIG. 3 is a block diagram of the instruction execution unit of the printer of FIG. 2.

The instruction execution unit 24 is shown in detail in FIG. 3. Data from the data in bus 22 is applied to an arithmetic logic unit (ALU) 32 from which it is communicated via local storage registers 34 and a pair of storage address registers 36 and 38 to a writable control storage 40 and a read only storage 42. The writable control storage 40 comprises a large buffer register provided by a plurality of integrated circuit cards; in the present example 8K × 11 FET monolithic chip storage cards provide a cycle capability of 500 nanoseconds. Other circuit cards comprise the remainder of the instruction execution unit 24 and the native channel 20.

The instruction execution unit 24 additionally includes a second arithmetic logic unit 44, a pair of storage data gates 46 and 48, a pair of main data registers 50 and 52, and a pair of microprogram instruction registers 54 and 56. In operation the storage data gates 46 and 48 which may comprise AND-OR circuits steer data from the writable control storage 40 and the read only storage 42 to the main data registers 50 and 52 and the microprogram instruction registers 54 and 56. The output of the main data register 50 is coupled to the arithmetic logic unit 44 as well as to the writable control storage 40. The output of the main dara register 52 is coupled to the writable control storage 40 and to the arithmetic logic unit 32 as well as to the data out bus. The microprogram instruction register 54 is coupled to the arithmetic logic unit 44, while the microprogram instruction register 56 is coupled to the control out bus, the arithmetic logic units 32 and 44 and the storage address register 38. The output of the arithmetic logic unit 32 is coupled as inputs to the local storage registers 34 as well as to inputs of the main data registers 50 and 52. The output of the arithmetic logic unit 44 is coupled as inputs to the local storage registers 34 as well as inputs of the main data register 50 and 52.

The instruction execution unit 24 has a two byte data flow, with each byte consisting of eight data bits and an odd parity bit. The registers are two bytes wide and have separate odd parity bits for the two different bytes which are designated a low order byte and a high order byte. The basic cycle of the instruction execution unit 24 is either 250 or 500 nanoseconds long, and the register gating is asynchronous. At the end of each cycle a clock pulse sets the registers. The instruction execution unit 24 alternates between a I cycle in which it fetches instructions from the writable control storage 40 or the read only storage 42 and an E cycle in which it executes the instructions. Each microinstruction stored in the writable control storage 40 is 16 bits long and is subdivided into fields that specify the operations registers and the functions and the data to be used during execution of the instructions.

The local storage registers 34 comprise 64 registers divided into eight groups of eight registers each for executing the eight levels defined by the microprograms. Seven registers in each group of eight are used as working registers by the microprogram and the eighth register is used as a microprogram address register (MAR). Each of the local storage registers is capable of storing two bytes.

Figure 4:
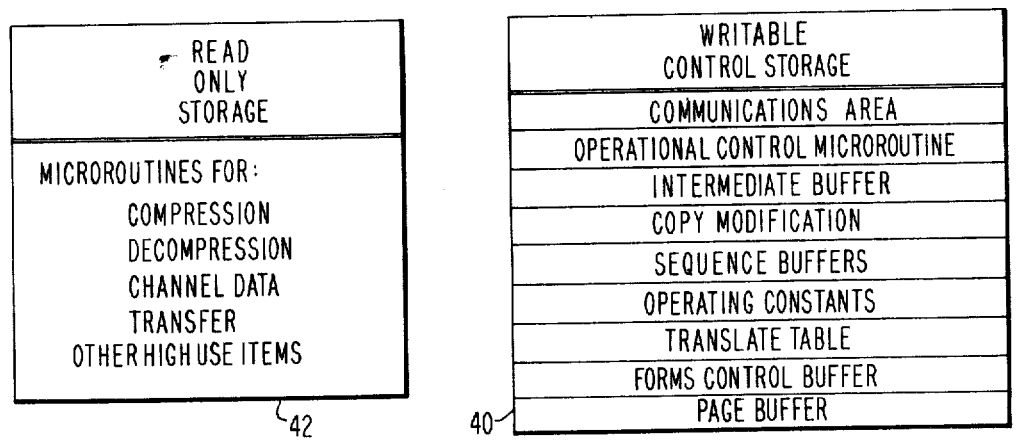
FIG. 4 illustrates the various data storage and processing functions accommodated by the writable control storage and the read only storage within the instruction execution unit of FIG. 3.

During operation of the instruction execution unit 24, bytes stored in the local storage registers 34 are transferred to the storage address registers 36 and 38. The first byte of each pair is stored in the high register 36 and the second byte of each pair is stored in the low register 38. The bytes stored in the storage address registers 36 and 38 are used to address the writable control storage 40 and the read only storage 42. The writable control storage 40 provides storage which is two bytes wide. The lower 8K bytes are used for the microprogram routines necessary for controlling the printer operation as shown in FIG. 4. Such storage area is also used to store necessary operating constants and tables and as format buffers. The remainder of the writable control storage 40 is used for page buffering, copy modification data and various sequence buffers, the operation of which is described hereafter.

The read only storage 42 is used to store certain microinstructions since data stored in the writable control storage 40 can be lost in the event of power failure. A microprogram routine stored in the read only storage 42 is used to load data into the writable control storage 40 from a flexible disk system for certain operations as described hereafter. Also high usage routines used for compression, decompression, channel data transfer and the like are stored in the read only storage 42.

Each of the arithmetic logic units 32 and 44 is one byte in width and is capable of performing AND, OR, EXCLUSIVE OR and ADD functions. Each of the arithmetic logic units 32 and 44 includes a pair of operand registers at the input thereof. The operand registers are each one byte wide and are used to store data for the arithmetic logic units. Examples of circuits which can be used as the arithmetic logic units 32 and 44 are shown on pages 9–315 and 9–320 of the First Edition of *The Integrated Circuits Catalog For Design Engineers*, published by Texas Instruments Incorporated.

During an I cycle in which the instruction execution unit 24 fetches microinstructions, the following sequence of operations is performed:

1. Select MAR register in local storage registers 34 corresponding to the current microprogram level.

2. Transfer contents of local storage registers 34 into storage address registers 36 and 38.

3. Select and start storage in the writable control storage 40 or the read only storage 42.

4. Transfer contents of low register from local storage registers 34 into operand 1 register of arithmetic logic unit 32.

5. Transfer contents of high register from local storage registers 34 into operand 1 register of arithmetic logic unit 44.

6. Enter 2 in operand register of arithmetic logic unit 32.

7. Enter 0 in operand 2 register of arithmetic logic unit 44.

8. Add the data storage in the arithmetic logic units 32 and 44.

9. Transfer contents of arithmetic logic unit 32 into low register of local storage registers 34.

10. Transfer contents of arithmetic logic unit 44 into high register of local storage registers 34.

11. Steer contents of storage data gates 46 and 48 into microprogram instruction registers 54 and 56.

12. Write updated instruction address into MAR register of local storage registers 34.

13. Write microinstructions to be executed into microprogram instruction registers 54 and 56.

An example of an E cycle in which the instruction execution unit 24 performs a "Branch Unconditional" instruction involves the following sequence of steps:

1. Transfer contents of microprogram instruction register 56 into operand 2 register of arithmetic logic unit 32.

2. Transfer contents of microprogram instruction register 54 into operand 2 register of arithmetic logic unit 44.

3. Transfer contents of operand 2 registers in arithmetic logic units 32 and 44 into arithmetic logic units 32 and 44.

4. Transfer contents of arithmetic logic unit 44 into high registers of local storage registers 34.

5. Transfer contents of arithmetic logic unit 32 into low registers of local storage registers 34.

6. Write new instruction address into MAR register in local storage registers 34.

Figure 5:
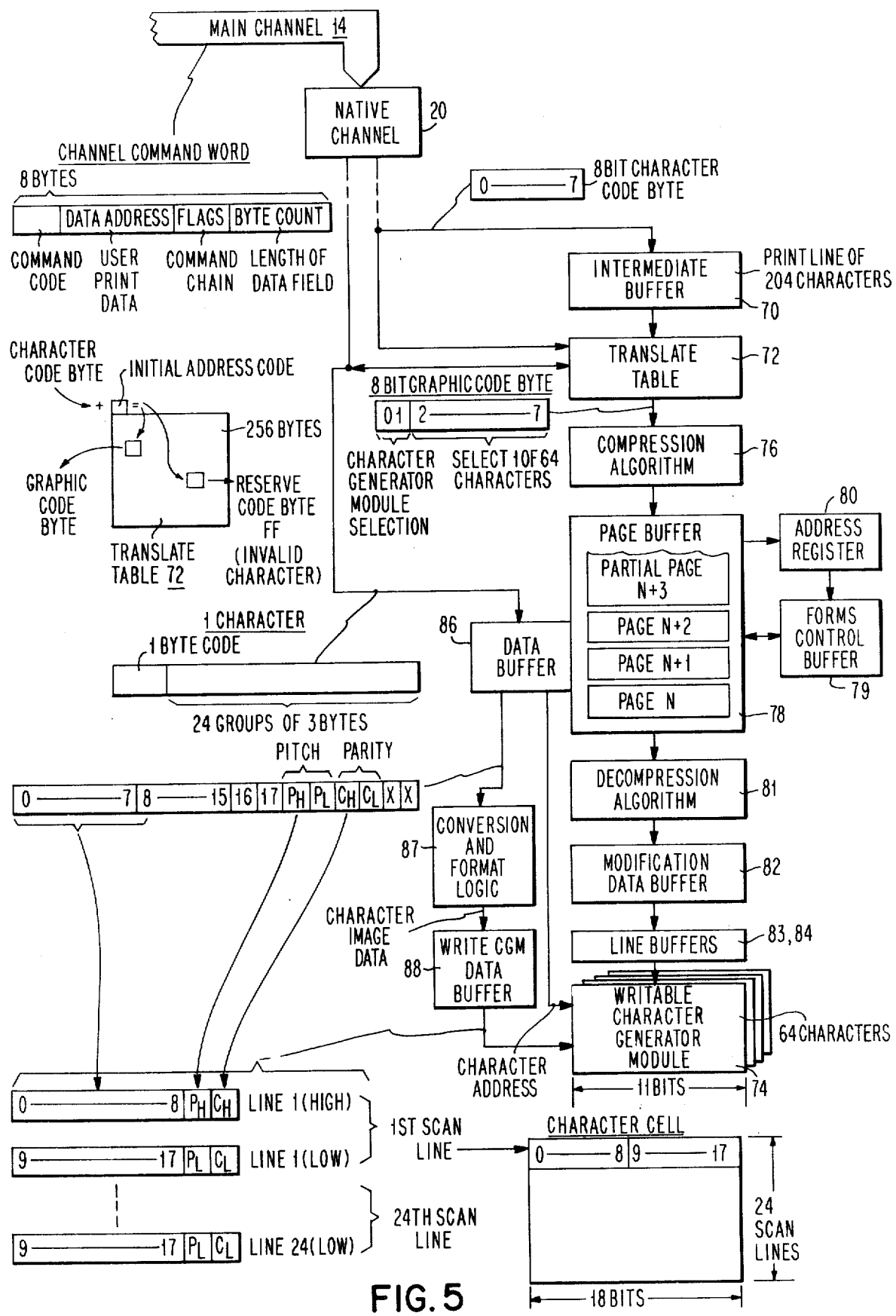
FIG. 5 is a block diagram, principally of the two different storages shown in FIG. 4, illustrating the manner in which coded data to be printed is formated and processed and presented to the character generator of the printer.

As previously mentioned data comprising commands and characters to be printed by the printer is communicated by the data processing unit 16 over the main channel 14 to the printer 12 where it is entered by the native channel 20 and routed to the instruction execution unit 24 for storage in the writable control storage 40. The storage 40 comprises buffers for storing and processing this data. The read only storage 42 supplements the writable control storage 40 by storing microroutines used for compression, decompression, channel data and transfer as well as certain other high use items as illustrated in FIG. 4. The writable control storage 40 provides a large buffer area for the storage of data and the formation of various tables and buffers under program control. As shown in FIG. 4 the writable control storage 40 provides among other things for an intermediate buffer, a page buffer, copy modification, sequence buffers, copier operation microroutines, operating constants, a translate table and forms control buffers. The principal ones of these various elements comprised by the writable control storage 40 which are used to process the data into a form usable by the character generator 27 are shown in FIG. 5 together with part of the character generator.

Data representing characters to be printed is communicated by the data processing unit 16 and initially stored in the instruction execution unit 24 in the form of a succession of eight bit character code bytes, with each byte representing a character to be printed. The eight bit character codes in the present example employ a hexidecimal representation to compact the data and are encoded using the well-known EBCDIC code.

The character code bytes are initially stored in an intermediate buffer 70 where up to 204 of the character code bytes are assembled to form a print line. 204 characters represents the maximum width of a print line for paper of given width in the imaging apparatus 26 and assuming the maximum possible pitch of 15 characters per inch. Up to this point the character code bytes are in exactly the same form they were in when generated and transferred by the data processing unit 16. The EBCDIC coding of the bytes defines the characters which the various bytes represent.

The various character code bytes stored in the intermediate buffer 70 are applied to a translate table 72 where they are translated, one by one, into corresponding graphic code bytes using the predetermined code or algorithm of the translate table 72. In the present example the predetermined code or algorithm of the translate table 72 is implemented by adding each character code byte to an initial address for the table 72 and using the resulting sum as an address for the corresponding graphic code byte stored within one of the various storage locations in the translate table 72. The translate table 72 is capable of storing up to 256 graphic code bytes, and has a position for all possible character codes that can come from the data processing unit 16. An example of the manner in which the translate table 72 may be set up is provided at page 57 of *IBM System/360 Principles of Operation*. Form A22-6821-6, Jan. 13, 1967, published by International Business Machines Corporation. Each of the graphic code bytes comprises the address of a set of character image bits stored within one of four different writable character generator modules 74. As shown in FIG. 5 each eight bit graphic code byte from the translate table 72 comprises a first two bit field identifying a particular one of the four different writable character generator modules 74 and a second six bit field identifying one of 64 different storage locations within the selected writable character generator module. As described hereafter the selection of a storage location within one of the writable character generator modules 74 by a graphic code byte results in a set of character image bits stored in the particular location being used at the imaging apparatus 26 to print a character.

As a practical matter only about ¼ of the 256 positions in the translate table 72 are needed. In such situations the remaining 192 positions are filled with a special reserve code byte which, if selected, indicate that an unprintable character has been selected. The reserve code provides an indication to the main channel 14 that an invalid character has been received.

The graphic code bytes from the translate table 72 are next compressed in length using a compression algorithm 76 as they are entered in a page buffer 78 for storage therein. As previously mentioned each line may comprise as many as 204 characters. Since a page can have as many as 80 lines thereon for 11 inch paper, a page can comprise as many as 16,320 bytes. Since the purpose of the page buffer 78 is to assemble the translated data into one or more pages, the page buffer 78 would have to have a minimum capacity of 16,320 bytes per page in the absence of compression. By using the compression algorithm 76 however the graphic code bytes for an average page are sufficiently reduced in number so that an equivalent of only about 2000 bytes is required in the way of storage space for each page in the page buffer 78.

In the present example compression is performed whenever a succession of identical characters occurs which has more than a predetermined number of the characters in it. The resulting information stored in the page buffer 78 consists of a first byte which identifies the presence of a compression, a second byte which indicates the number of character being compressed, and a third byte which is the character being compressed. An example of a compression technique which may be used is provided in IBM Technical Disclosure Bulletin Vol. 16, No. 8, January, 1974, DATA COMPRESSION TECHNIQUE FOR THE ELIMINATION OF REPEATING BYTE STRINGS, M. Ojalvo.

The page buffer 78 continues to assemble the compressed graphic code bytes into pages until filled. While the page buffer 78 is only required to store at least one complete page, it is typically provided with enough storage capacity to store several pages as shown in FIG. 5.

The channel command words from the data processing unit 16 include certain modifier bits which control the vertical format of each page in terms of the space between lines and the height of the characters in each line. These functions are provided by a forms control buffer 79 in conjunction with an associated address register 80. The operation of the forms control buffer 79 and the address register 80 is described in a copending application, Ser. No. 522,995, Gerald I. Findley and Teddy L. Anderson, INTERMIXED LINE HEIGHTS AND BLANK LINE FORMATION IN A BUFFERED PRINTER. As described in that application a different forms control byte is stored in the forms control buffer 79 for each line entered in the page buffer 78. The address register 80 identifies the various forms control bytes. One bit of each forms control byte defines the height of a corresponding line and is applied in the character generator 27 to select the number of scan lines used when the line is printed. Other bits in each forms control byte define a channel number. A channel command word defines blank lines to be inserted in a page by specifying the channel number to be skipped to or the number of lines to be spaced. Each time the address register 80 is incremented in spacing or skipping to the sought channel number within the forms control buffer 79 a special code is entered in the page buffer 78. When the page is being printed by the character generator 27, each of the special codes causes the character generator 27 to inhibit any modulator output so that a blank line results in the printed page.

As previously mentioned the page buffer 78 is capable of simultaneously storing several pages of graphic code bytes. A buffer interloc system is provided to prevent overfilling of the page buffer 78. When the page buffer 78 is not completely filled a device end status condition is communicated to the main channel 14, indicating that the main channel 14 should proceed to the next channel command word. It room is not available in the page buffer 78 control logic simply monitors the situation, then generates the device end status condition at such time as room becomes available.

The compressed graphic code bytes assembled into pages in the page buffer 78 are decompressed upon leaving the page buffer 78 by a decompression algorithm 81 which is the inverse of the compression algorithm 76 prior to being passed together with data from a modification data buffer 82 to one of a pair of line buffers 83, 84 within the character generator 27. The decompression algorithm 81 restores each graphic code byte to the original format that it assumes at the output of the translate table 72. The modification data buffer 82 stores data used in making minor changes between copies when plural copies of the same page are to be printed. This avoids the necessity of assembling a complete page in the page buffer 78 for each page which differs only in minor respects from a previously printed copy.

The imaging apparatus 26 of the present example modulates a laser beam as the beam is scanned in raster fashion over a character space to print each character. Each character space is defined by a character cell having a height defined by 24 scans of the laser beam and a width defined by 18 bits representing the number of times the beam can be modulated during each scan of the character cell. Each set of character image bits stored in one of the writable character generator modules 74 comprises as many as 432 bits defining the 18 horizontal bit spaces for each of the 24 different scans of the laser beam. Accordingly the character image bits define those portions of the grid pattern or matrix comprising the character cell which the particular character to be printed comprises.

In the present example each writable character generator module 74 is only 11 bits wide while the character cell is 18 bits wide. Accordingly it is necessary to break each scan line of 18 bits of the character cell into two sections of data for purposes of storing the sets of character image bits in the writable character generator module 74. Since each character may involve as many as 24 scan lines, 48 sections of data must be stored in the writable character generator module 74 for each set of character image bits. Since each writable character generator module 74 is 11 bits wide, each section of data stored therein is 11 bits long and includes a field of 9 bits, a parity bit and a pitch bit. Each pair of the sections of data stored in the writable character generator module 74 comprises a high section and a low section. As described in connection with the character generator of FIG. 6 a complete line of characters is printed a scan at a time. Accordingly the two sections of bits corresponding to the scan for each character are successively taken from the writable character generator modules 74 and used to modulate the laser beam.

The sets of character image bits stored in the writable character generator modules 74 are program alterable directly from the data processing unit 16. Sets of character image bits can initially be loaded into the writable character generator modules 74 either directly from the data processing unit 16 or from a flexible disk storage described in FIG. 6, and the sets of character image bits can be selectively replaced under control of the data processing unit. Each set of character image bits to be stored or replaced in one of the writable character generator modules 74 is communicated over the main channel 14 from the data processing unit 16 in the form of a 73 byte block as shown in FIG. 5. The first byte of the block defines the storage location within the writable character generator modules 74 where the new set of character image bits is to be stored. The remaining 72 bytes of the block arranged into 24 groups of three bytes each define the character image bits. Each group of three bytes contains the 18 bits for one of the scan lines of the character cells.

The first byte of the block comprising a character address is routed to a data buffer 86 via the translate table 72 where it is converted by the table address. The remaining 72 bytes of the block are routed directly to the data buffer 86. The data buffer separates the character address from the remaining 72 bytes comprising image data and passes the character address to the writable character generator modules 74. One group of three bytes (24 bits) is shown at the output of the data buffer 86 in FIG. 5 and includes the 18 bits comprising the scan of the character cell (0-7, 8-15, 16, 17), a high pitch bit $P_H$, a low pitch bit $P_L$, a high parity bit $C_H$, a low parity bit $C_L$ and two spare bit spaces designated X.

The 3 byte groups from the data buffer 86 are applied to conversion and format logic 87 where they are converted and reformatted into pairs of 11 bit sections for storage in the writable character generator modules 74. The conversion and format logic 87 uses appropriate AND-OR circuitry for reformating the 3 byte group into a first section comprising bits 0–8, $P_H$, $C_H$ and a second section comprising bits 9–17, $P_L$, $C_L$. The converted and reformatted sections are loaded into the writable character generator modules 74 via a write character generator module data buffer 88. The 1 byte code character address at the output of the data buffer 86 functions in the manner of the graphic code bytes at the output of the translate table 72 to define a selected one of the four writable character generator modules 74 and the selected one of the 64 different locations within the selected module in which the new set of character image bits is to be stored.

Like the writable character generator modules 74, the translate table 72 can be loaded directly from the data processing unit 16. The translate table 72 has a storage capability of 256 graphic code bytes, to handle up to 256 sets of character image bits which can be stored in the writable character generator modules. Where less than 256 graphic code bytes are needed, the unused storage spaces in the translate table 72 are loaded with FF reserve code bytes which are used to indicate selection of an invalid character to the main channel 14.

Because the character eventually printed is determined by the predetermined code or algorithm of the translate table 72, the printer can be made responsive to virtually any code for the incoming character code bytes by changing the predetermined code or algorithm. Thus by simply rearranging the locations of the graphic code bytes witin the table 72 the code or algorithm can be changed so as to print given characters in response to a new code. The same character can be generated in response to different codes by storing the corresponding graphic code in different locations within the translate table 72.

The versatility provided by the translate table 72 together with the versatility of the printer system in general enable printers in accordance with the invention to be used with different data codes. Where desired, the printer can be arranged to use the same data code and channel commands as existing impact printers or other equipment in the data processing system when the printer is added to the system.

As described in a copending application, Ser. No. 522,994, filed November 11, 1974, now U.S. Pat. No. 4,005,390, issued Jan. 25, 1977 to Gerald I. Findley, MERGER AND MULTIPLE TRANSLATE TABLES IN A BUFFERED PRINTER, the same character code can be used to print different graphic characters by using plural translate tables in which the same character code addresses different graphic codes in the different tables. The different graphic characters can be printed in the same line by merging the selected graphic code bytes from the different translate tables into the same line in the page buffer 78. Merger is accomplished by temporarily writing one or more lines at the input of the page buffer under a no space command, following which a line is written with a space command. The no space command causes the lines to merge in accordance with an algorithm, following which they are stored as one line in the page buffer.

Figure 6:
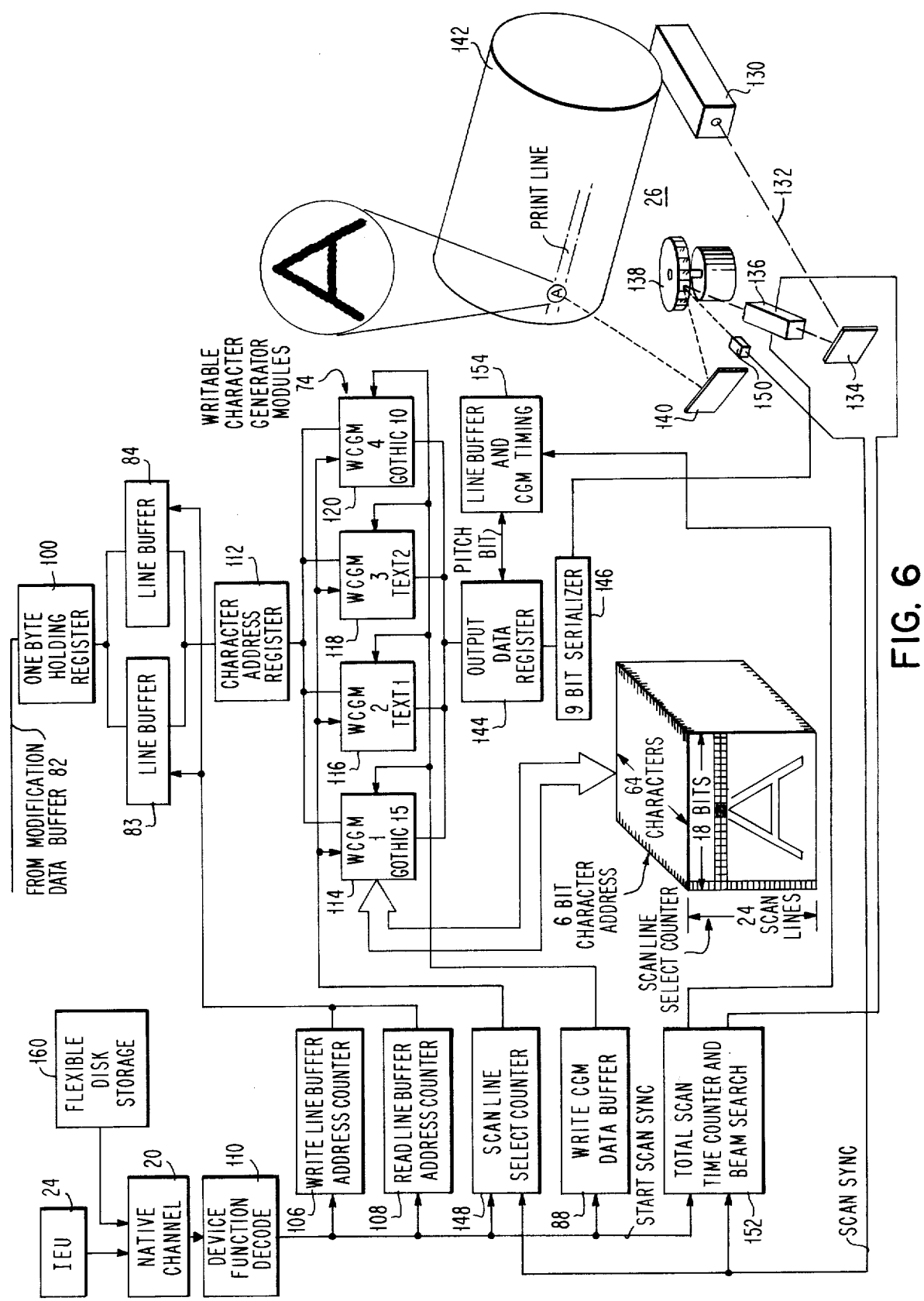
FIG. 6 is a block diagram of the character generator of the printer and a perspective view of a portion of the imaging apparatus of the printer.

The character generator 27 is shown in FIG. 6 together with a portion of the imaging apparatus 26. The graphic code bytes from the writable control storage 40 are fed via the native channel 20 to the character generator 27 where they are received by a 1 byte holding register 100 at the inputs of the line buffers 83 and 84.

The loading and unloading of the line buffers 83 and 84 is controlled by a write line buffer address counter 106 and a read line buffer address counter 108 coupled to a device function decode 110. The device function decode 110 responds to control data from the instruction execution unit 24 which is intended for the character generator 27 to the exclusion of other data. Examples of circuits which can be used as the device function decode 110 are shown on page 9–163 of the First Edition of *The Integrated Circuits Catalog For Design Engineers*, published by Texas Instruments Incorporated. The control data is fed via the native channel 20 to cause the contents of one of the line buffers 83, 84 to be passed to the writable character generator modules 74 for printing while the other line buffer is being loaded from the 1 byte holding register 100, and vice versa. Accordingly the line buffers 83 and 84 alternately load and print. While the write line buffer address counter 106 controls the loading of one of the line buffers 83, 84 one byte at a time to assemble a print line therein in response to control data from the microprogram, the read line buffer address counter 108 responds to the character generator attachment 29 to control the outputting of the other line buffer through a character address register 112 to the writable character generator modules 74.

In the present example the four different character generator modules 74 comprise modules 114, 116, 118 and 120. The first module 114 is loaded with Gothic 15 pitch characters, the second module 116 is loaded with characters conforming to a text 1, the third module 118 is loaded with characters conforming to a text 2 and the fourth module 120 is loaded with Gothic 10 pitch characters. Each of the modules 114, 116, 118 and 120 is capable of storing up to 64 characters. The contents of the first character generator module 114 are graphically illustrated in FIG. 6 in terms of the 24 scans of 18 bits each comprising each of the 64 characters. Two of the 18 bit scan lines are shown for the top portion of the character A. As previously described the bits within the module 114 modulate a laser beam to produce the desired character.

The imaging apparatus 26 includes a laser 130 for providing a laser beam 132. The laser 130 may comprise a lower power Helium neon laser, as shown, for example, in U.S. Pat. No. 3,750,189. The laser beam 132 is reflected by a mirror 134 through a modulator 136 and onto a rotating mirror 138. The modulator 136 may comprise an acousto-optic modulator of the type shown in U.S. Pat. Nos. 3,419,322 and 3,586,120. The rotating mirror 138, which may comprise a series of reflective facets on a metal block as shown, for example, in U.S. Pat. No. 3,750,189, has a plurality of small mirrors spaced about the periphery thereof so as to reflect the laser beam from the modulator 136 into a mirror 140. The mirror 140 reflects the modulated laser beam onto a rotating print drum 142. The rotating mirror 138 rotates at a selected speed to provide a rapid succession of scans of the modulated laser beam across the print drum 142. The portion of the imaging apparatus 26 thus described operates in a fashion similar to the apparatus shown in the previously referred to U.S. Pat. No. 3,701,999 of Congleton et al to provide rapid scanning of the modulated laser beam across the drum 142.

The modulator 136 causes the laser beam 132 to be modulated by bits from the character generator modules 74 applied via an output data register 144 and a nine bit serializer 146. Examples of circuits which can be used as the nine bit serializer 146 are shown on page 9-124 of the First Edition of *The Integrated Circuits Catalog For Design Engineers*, published by Texas Instruments Incorporated. Timing of the character generator modules 74 is controlled by a scan line select counter 148 which is initialized to the first scan line at the start of each print line. Thereafter the scan line select counter 148 operates in response to a scan sync signal from a scan start detector 150 to synchronize the outputting of bits from the character generator modules 74 with the rotation of the mirror 138. The scan start detector 150, which comprises a sensing device responsive to light of laser wavelength such as a photocell, a phototransistor or a photodiode of the type shown, for example, in U.S. Pat. No. 3,750,189, generates a signal in response to each facet of the rotating mirror 138 and therefore signals the beginning of each scan. A total scan timer counter and beam search 152 responds to a start scan sync signal from the device function decode 110 to initiate operation of the modulator 136. As each scan is begun the scan start detector 150 signals the scan line select counter 148 to pick a particular scan of a graphic in one of the writable character generator modules 74 and to begin feeding bits from one of the character generator modules 74 to the output data register 144. The read line buffer address counter 108 keeps a count of the various character positions in the line buffers 83, 84. At the beginning of each scan as determined by the scan line select counter 148, the character address register 112 causes selection of the appropriate bits from the writable character generator modules 74 under the control of the read line buffer address counter 108. The total scan time counter and beam search 152 responds to the scan sync signal at the start of each scan to turn on the modulator 136 and the laser 130 for the next scan start. Examples of counter circuits which can be used in the total scan time counter and beam search 152 are shown on page 9-58 of the First Edition of *The Integrated Circuits Catalog For Design Engineers*, published by Texas Instruments Incorporated.

At the beginning of each scan the first line of data bits corresponding to the first scan of the first character is advanced to the output data register 144 where the pitch bit $P_H$ or $P_L$ thereof is sensed by line buffer and CGM timing 154. The line buffer and CGM timing 154 may comprise an oscillator driven ring of latches. The pitch bit determines the pitch or width of the character in a manner which is described in detail in a copending application, Ser. No. 522,996, filed Nov. 11, 1974, now U.S. Pat. No. 3,999,168, issued Dec. 21, 1976 to Gerald I. Findley, Teddy L. Anderson and Kenneth D. Cummings, INTERMIXED PITCHES IN A BUFFERED PRINTER. As described in that application, the line buffer and CGM timing 154 responds to a horizontal oscillator within the total scan time counter and beam search 152 by passing to the nine bit serializer 146 only those bits of each scan which are to be printed as determined by the pitch bits. While all 18 bits of each scan are used for a pitch of 10 characters per inch, only 12 bits of each scan are used for a pitch of 15 characters per inch so as to truncate the width of the character cell.

The pitch of the character having been determined, the section representing the first half of the first scan of the first character temporarily stored in the output data register 144 is advanced to the nine bit serializer 146 where each of the bits thereof is serially fed to the modulator 136 to modulate the laser beam 132 as it scans across the first half of the first character. At that point the second section of data is advanced through the output data register 144 to the nine bit serializer 146, and the resulting serial stream of bits is used to modulate the laser beam during the second half of the first scan of the first character. At this point the laser beam is about to begin the first scan of the second character on the line. The first and then the second sections of bits representing the first scan of the second character are successively advanced through the output data register 144 and the nine bit serializer 146 to modulate the laser beam. The system continues in this fashion until the laser beam has completed the first scan of each of the characters in the line, at which point the scan line select counter 148 is incremented and the next scan of the laser beam begins and is sensed by the scan start detector 150. The third and then the fourth sections of data bits for the first character are provided to the output data register 144 and the nine bit serializer 146 to print the second scan of the first character. The third and fourth sections of bits for each succeeding character are used to modulate the laser beam until the second scan of the entire print line is completed. The system continues in this fashion until the laser beam has made 24 scans of the print line and all characters on the line have been printed. Thereafter the process is repeated for each succeeding print line.

As previously mentioned the sets of character image bits in the character generator modules 74 can be loaded or replaced directly via the data buffer 84, the conversion and format logic 86 and the write CGM data buffer 88. Alternatively the sets of character image bits can be loaded directly from a flexible disk storage 160 via the write CGM data buffer 88.

Figure 7:
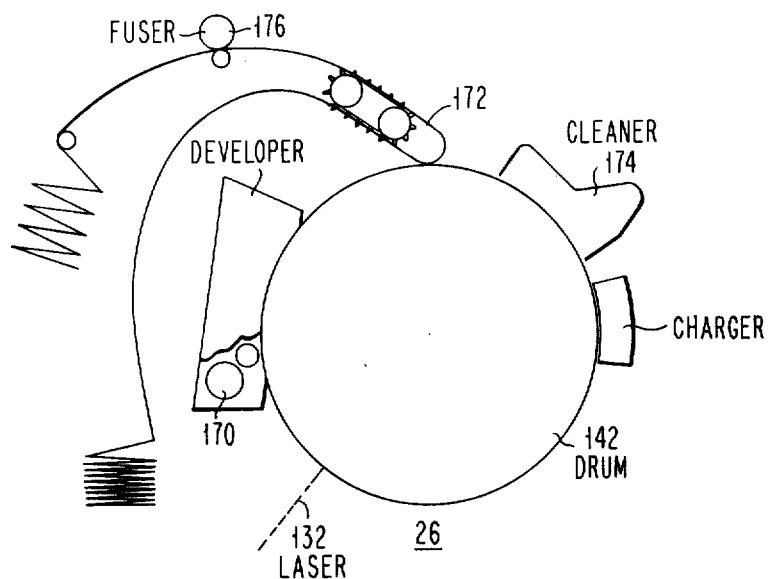
FIG. 7 is a side view of the imaging apparatus of the printer.

The remaining portions of the imaging apparatus 26 are shown in FIG. 7. The imaging apparatus 26 employs known electrophotographic techniques to develop the discharged area on the surface of the drum 142 which results from the modulated laser beam 132. As the drum 142 rotates past a developer 170, the surface is coated with a toner. The toner adheres to the discharged areas of the surface and is transferred onto a paper 172 which comes into contact with the drum surface downstream of the developer 170. Any toner remaining on the surface of the drum 142 is removed by a cleaner 174 in preparation for the next movement through the laser scan. The paper 172 as so printed with the toner is advanced through a fuser 176 to a continuous forms stacker.

As described in a copending application, Ser. No. 522,997, filed Nov. 11, 1974, now U.S. Pat. No. 3,971,044, issued July 20, 1976 to Gerald I. Findley and Teddy L. Anderson, ELECTRONIC HORIZONTAL SHIFTING AND VARIABLE PRINT WIDTH IN A BUFFERED PRINTER, the print line can be shifted horizontally relative to the paper where necessary by adding a selected value to a fixed margin offset and decrementing the resulting sum in a counter upon detection of the scan start before turning on the beam to commence printing. The size of the print line is adjusted to the width of the paper by subtracting the selected value from the width of the paper and using the resulting difference to decrement the counter during printing so that printing is terminated as soon as the counter has been decremented by the difference.

As previously mentioned the microprogram processed by the instruction execution unit 24 comprises eight prioritized levels, with each level having eight different registers of the local storage registers 34 assigned thereto. The eight different levels are as follows beginning with the highest priority level and ending with the lowest priority level:

Level 0 — ROS service functions
Level 1 — system channel
Level 2 — reserved
Level 3 — drum/process
Level 4 — paper transport
Level 5 — line buffer
Level 6 — reserved
Level 7 — command execution Level 0 is used principally for service and error functions. Various microroutines can be entered if errors such as parity errors are detected. Certain other routines can be used to determine that the system is functioning properly. During Level 0 an IMPL (Initial Micro Program Load) routine may be entered. This routine is used to load the writable control storage 40 with microprograms stored in the flexible disk storage 160 shown in FIG. 6.

Level 1 is used principally to enable the printer to communicate with the main channel 14. It is during this level that the channel command codes executed by the Level 7 microprogram are transmitted and stored in the printer. Level 1 is entered when the printer is to communicate with the main channel 14.

Level 3 is entered when the imaging apparatus drum begins operating. Various counters created by the microprogram and associated with the imaging apparatus are updated. If a page is ready in the page buffer 78, the microprogram starts the printing process for that page. When an image on the drum arrives at the transfer station for transfer onto the paper, a servo is activated to start paper motion and transfer the image to the paper.

Level 4 is entered on receipt of signals from the transfer station where the paper contacts the drum 142 or from the fuser 176. Counters within the imaging apparatus that keep a positional location count for each page in the paper transport are updated, and the fuser 176 is started and stopped as the paper moves. Printed pages are stacked in the continuous forms stacker.

Level 5 is entered when it is time for the character generator 27 to place a line on the surface of the drum 142. The microprogram operates one line ahead of the actual placement, filling one of the line buffers 83, 84 while the character generator 27 is printing out data stored in the other. Each line is taken out of the page buffer 78 and is decompressed by the algorithm 81.

Level 7, the lowest level of the 8 different levels, is entered when there are no interrupt requests for the other levels. The Level 7 microprogram executes channel commands transferred to the printer during Level 1. Data transfer subroutines are invoked for commands involving data transfers. The print lines received are translated from the 8 bit character code bytes into the graphic code bytes. Characters are compressed and placed in the page buffer 78. Forms control functions are performed by placing blank lines in the page buffer 78. The Level 3 microprogram is activated when full pages are ready to be printed.

There are five different types of channel commands, which include:
1. Forms Commands
2. Write Commands
3. Load Commands
4. Status Commands
5. Control Commands The Forms Commands control the vertical format of a page via the forms control buffer 79. The forms control buffer which contains control information for vertical line spacing is loaded with the specifications for a paper control tape before any transfer of data from the data processing unit 16 to the page buffer 78 takes place. When data is transferred to the page buffer 78 the contents of the forms control buffer 79 are analyzed. Where necessary, blank lines are inserted into the page buffer 78. If it is determined that a complete page is ready for printing, the page is readied for readout to the character generator 27, and the next page is initialized within the page buffer 78 so as to follow the completed page.

The Write Commands are provided for transferring data to the printer 12 from the data processing unit 16. Each Write Command transfers one print line. The characters comprising the line are entered in the intermediate buffer 70 as they are received from the data processing unit 16. After 204 bytes have been received, the printer operates to terminate the transfer.

The Load Commands are used to initialize the control electronics, the buffers and the tables in the printer. Upon the occurrence of Load Commands any remaining partial page in the page buffer 78 is finished and the system skips to the beginning of the next page. If various portions of the page buffer 78 used to perform control functions are to be loaded with new data, all such previously allocated control buffers within the page buffer are eliminated. Further Load Commands may be broken down as follows:

1. Load Forms Control Buffer
2. Load Translate Table
3. Load Writable Character Generator Modules
4. Load and Execute Microroutine
5. Load Graphic Character Modification
6. Load Copy Modification
7. Load Forms Overlay
8. Load Copy Number The operation of the system in response to these various Load Commands is as follows:

1. Load Forms Control Buffer

One of the load commands loads the forms control buffer 79 with a forms control byte for each line to be entered in the page buffer 78. One of the bits in each byte is a "vertical space bit" that determines whether the vertical spacing is to be six lines per inch or eight lines per inch. four of the bits comprise a channel code identifying the line. After the forms control buffer 79 is loaded, spacing and skipping operations are accomplished by blank line insertion (one byte for each line) in the page buffer 78.

2. Load Translate Table

This command is used to load up to 256 bytes in the translate table 72.

3. Load Writable Character Generator Modules

The sets of character image bits are normally stored in the flexible disk storage 160 shown in FIG. 6. To use a particular set, it must be read from the disk storage 160 and loaded into one of the character generator modules 74. Once a set is loaded into a character generator module, it remains in the module until the next command to load the character generator modules. A writable character generator module is not reloaded if it already contains an unmodified version of the set of character image bits to be loaded.

4. Load and Execute Microroutine

This command is used with diagnostic programs to load and execute a microprogram routine in the control electronics for the printer. Storage for 128 microprogram instructions comprising two bytes each or 256 bytes is available in a defined area of the writable control storage 40. The load portion of the command causes the printer to store a microprogram routine sent from the main channel 14. An indication of channel end is then presented to the channel 14. The execution portion of the command produces a branch to the first instruction. The routine loaded can then perform its functions. At the conclusion of the execution of the routine, the printer presents a device end signal to the main channel 14.

5. Load Graphic Modification

As previously mentioned, the sets of character image bits are loaded into the writable character generator modules 74 from the flexible disk storage 160. The graphic coding for characters located in these modules can be replaced by the data processing unit 16. A "Load Graphic Character Modification" channel command is used to transfer the bit coding for the new graphics as replacements for any of the characters in any of the character generator modules 74 in the printer. The data format consists of 1 to 64 entries of 73 bytes per entry. One such entry of 73 bytes is shown and discussed in connection with FIG. 5. The one byte code at the beginning of each entry comprises the eight bit code that defines the address of the graphic character being loaded. This code is used to index the translate table 72. The translate code obtained is used to address the writable character generator modules 74 for storing the character image bits contained in the 72 bytes following the character code.

6. Load Copy Modification

Figure 9:
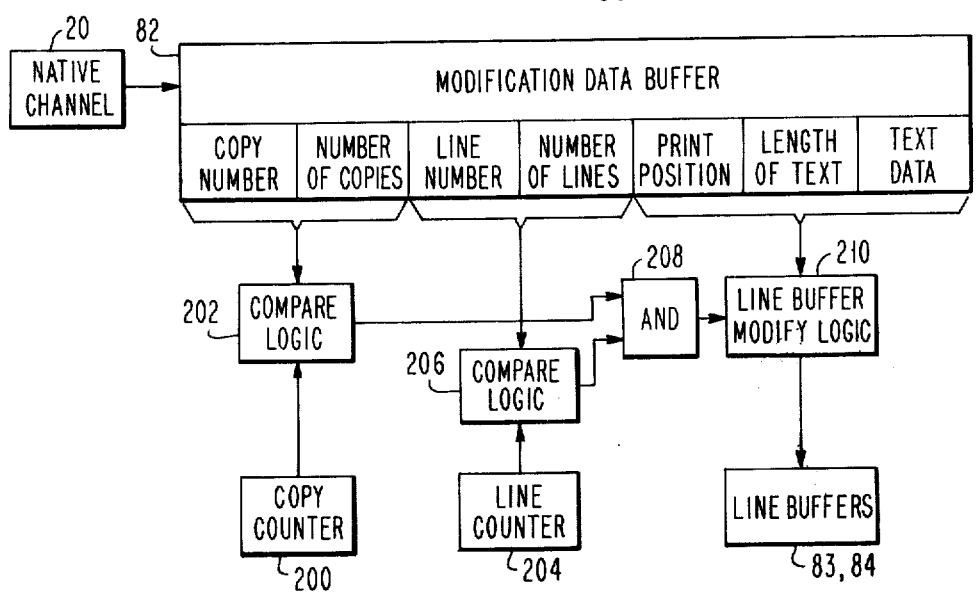
FIG. 9 is a block diagram of circuitry for producing copy modification.

As described hereafter in connection with FIG. 9 the modification data buffer 82 provides for copy modification by modifying or deleting selected areas of given forms stored in the page buffer 78. A "Load Copy Modification" channel command results in communication of copy modification data to the printer 12. The communicated data includes control data for the copy modification process and text data denoting the exact changes to be made in the various copies. The text data which is stored in the modification data buffer 82 is employed to modify a page of data as the data is advanced from the page buffer 78 to the character generator 27 for printing of the data.

7. Load Forms Overlay Control

In some situations it may be desirable to be able to add fixed data to various different pages as the pages are printed. The added data may comprise such things as horizontal or vertical lines or a company name to be added to selected pages using a forms overlay process which employs a film negative and an arrangement for flashing the image of the negative onto the drum 142 prior to coating with toner. The "Load Forms Overlay Control" channel command provides to the printer a record of the number of copies to be made and whether or not the forms overlay is to be flashed.

8. Load Copy Number

This channel command specifies the copy number of the transmission of a set of data to the printer. It enables the microprogram to examine and process modification data for a particular copy to the exclusion of data for other copies. As each copy of a page is made, the copy number is incremented.

Status commands are used to determine the status of the printer and to perform various test functions.

The Control Commands perform various control functions in the printer. Such commands set various conditions throughout the printer enabling various functions to be performed. Included among such commands are commands which cause any remaining partial page in the page buffer 78 to be printed, which cause certain buffers to be erased when no longer needed, and which cause the translate table 72 to be selected.

Figure 8:
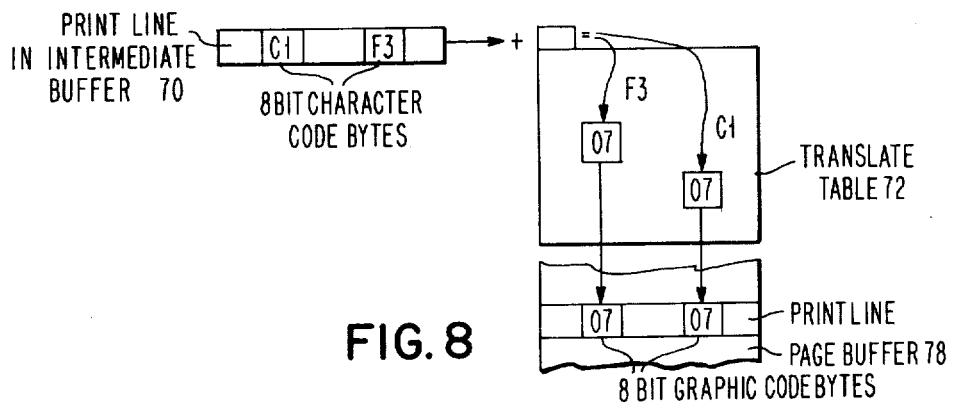
FIG. 8 is a graphical illustration of the manner in which different character codes are used in the translate table to print the same graphic character.

As previously mentioned the character code to graphic character mapping provided by the translate table 72 provides the system with a versatility producing a number of distinct advantages not found in prior art printers. Printers according to the invention have a universal character set capability. Thus, by a simple change in the storage location of an 8 bit graphic code within the translate table 72 a different character code can be used for printing the particular character involved. In addiion, multiple character codes can be used for the same graphic, providing for a folding capability. Thus, as illustrated in FIG. 8 the same graphic code byte can be selectively stored in different locations within the translate table 72. Different character code bytes can be used to select the same graphic code byte as stored in the different locations within the translate table 72, resulting in the same graphic code byte appearing in the print line as it is assembled in the page buffer 78. In the example of FIG. 8 two different eight bit character code bytes C1, F3 appear at different locations in a print line received in the intermediate buffer 70. When applied to the translate table 72 the character code bytes C1 and F3 provide for the selection of two different storage locations within the translate table. By providing the two different storage locations with the same 8 bit graphic code bytes, in this case 07, the resulting print line as assembled in the page buffer 78 contains the graphic code bytes 07 in the character spaces corresponding to the spaces containing C1 and F3 in the print line as received in the intermediate buffer 70. Consequently when the graphic code bytes 07 are applied to the writable character generator modules 74 the same character is printed. In this manner different character codes can be used to print the same graphic.

As mentioned in connection with FIG. 5 the modification data buffer 82 provides the capability of using the same page of graphic code bytes in the page buffer 78 to print multiple copies of a form where the various copies differ from each other in relatively minor respects. This feature can be used, for example, to print a multi-copy shipping form where each copy contains the same basic information but differs in items such as page number and title of the copy such as "Shipper's copy" and "Customer's copy." It is also common with such forms to delete substantial portions of the form from several of the copies.

The modification data buffer 82 provides for copy modification by modifying or deleting selected rectangular areas of given forms stored in page buffer 78. Modification data bits from a channel command word reach the native channel 20 from which they are communicated to the modification data buffer 82. The modification data bits stored in the buffer 82 denote a variety of information for each form to be printed including the numbers of the various copies and the line numbers on the copies where modifications are to be made. The modification data bits further denote a particular location within the selected lines, the length of each modification, and the modification itself. When the printer is printing, the line buffers 83 and 84 in the character generator 27 are alternately filled with lines of characters to be printed. The modification data entries in the buffer 82 are examined for each line in one of the line buffers 83, 84. First the copy count for the page being printed is entered into a copy counter 200 where it is compared by compare logic 202 comprising a comparator with the copy range of the entries in the modification data buffer 82. The line count for the line about to be printed as entered in a line counter 204 is compared by compare logic 206 comprising a comparator with the line count range of the entries in the modification data buffer 82. If the modification entry control information matches in the line buffer 83 or 84 as determined by an AND gate 208, then the print position stored within the buffer 82 is applied by line buffer modify logic 210 to address the line buffer 83 or 84 and locate the character positions. The length of text data in the buffer 82 specifies the size of the text data. The text data from the buffer 82 is entered into the line buffer 83 or 84 via the line buffer modify logic 210 to make the desired modification. Where selected portions of the data comprising a line entered into one of the line buffers 83 or 84 are to be modified, the text data results in new characters being entered directly into the line buffer 83 or 84. Where the modification calls for deletion of characters, the text data results in destruction of selected ones or all of the characters assembled in the line buffer 83 or 84.

There are two ways in which multiple copies of multi-page forms are printed. The first way is to load the first page of the form into the page buffer 78 while at the same time loading modification data for all copies of the first page into the modification data buffer 82. The first copy of the first page is then printed as modified by the modification data for copy number 1, following which copy number 2 of the first page is printed, and so on. When all copies of the first page have been printed the second page is loaded into the page buffer 78 while modification data for the various copies of the second page are loaded into the modification data buffer 82. The printer 12 then proceeds to print the various copies of the second page as modified by the data stored in the modification data buffer 82, following which the procedure is repeated for the third and subsequent pages of the form. The second way of printing multiple copies of multi-page forms is to load all of the pages into the page buffer 78, while at the same time loading modification data for the first copy of each page in the modification data buffer 82. Thereafter the first copy of each page is printed after appropriate modification, following which the pages are reloaded into the page buffer 78 with modification data for the second copy of each page being loaded in the modification data buffer 82. The process continues with the pages of the form being reloaded with modification data for each copy, until all copies of the pages are printed.

The operation of printers in accordance with the invention may be even better understood by considering an example of the processing of a print line from its origin in the data processing unit 16 through the final printing by the copier 26. In this example the print line consists of the characters "PXXCCC....*****".

Initially an instruction stream is processed in the central processing unit of the data processing unit 16. The processing of the instruction stream provides for the generation of the print line consisting of characters that the program determines should be printed on paper. A channel command word is then made up. The first field of the channel command word comprises the command code which the printer is to execute as determined by the user's program. The second field of the channel command word is the address of the print line that was just generated. The third field of the channel command word comprises flags that control execution of the channel command word by the main channel 14. The fourth and last field of the channel command word is the byte count which gives the number of characters in the print line.

When generation of the channel command word is complete, a channel address word is generated so as to identify the first channel command word to be performed by the main channel 14. The channel address word is located in the main storage of the data processing unit 16. The central processing unit then executes a start input/output instruction which specifies the channel and device address of the printer within the data processing system 10. The main channel 14 accesses the channel address word to find the beginning location of the channel address word to find the beginning location of the channel command word. Thereafter the main channel 14 accesses the fields in the channel command word and uses this information to control the execution of the channel command word.

In the present example the command code is a hexidecimal "09". This command stands for "write and space one line". The flag field may indicate command chaining or suppressing incorrect length indication. The count field will show the number of characters in the print line. The main channel 14 has all the information necessary to execute the command, and begins by transmitting the device address. The printer 12 compares the device address and determines that it is the address of the printer. Such determination having been made, the printer 12 interrupts operation of the control logic therein. The control logic proceeds through an initial selection protocol sequence with the main channel 14. This sequence involves transmitting the printer address to the main channel 14, whereupon the channel responds with the command "09".

After receiving the command, the printer 12 responds with initial status to indicate to the channel 14 that the printer can proceed with execution of the channel command. Upon acceptance of the initial status by the channel 14 on a byte multiplex channel, the printer 12 disconnects from the main channel 14. The control logic within the printer 12 passes the command code which has been received from the channel 14 to the control logic that will execute the command code. Execution consists of decoding the command to determine the function that the printer is to perform. In the present example the "09" command causes the data transfer logic to be invoked so that the printer is ready for receipt of a print line of up to 204 characters from the main channel 14. The data is read into the printer 12 through the main channel 14 via bus and tag cables. After entering the channel attachment 21, the data flows through the data in bus 22 of the native channel 20 to the instruction execution unit 24. The instruction execution unit 24 is executing the microprogram which causes the incoming data to be loaded in the intermediate buffer 70.

The print line as stored in the intermediate buffer 70 is in character code form and employs the standard EBCDIC representation of the graphic characters. In the present example the character "P" is stored as "D7", "X" is stored as "E7", "C" is stored as "C3", "." is stored as "4B" and "*" is stored as "5C". Accordingly the print line as stored in the intermediate buffer 70 appears as "D7 E7 E7 C3 C3 C3 4B 4B 4B 4B 5C 5C 5C 5C 5C".

The discussion thus far of the manner in which a print line is originated in the data processing unit 16 and communicated by way of a channel command word via the main channel 14 into the printer 12 involves conventional techniques and hardware as described in the various patents previously referred to.

Figure 10:
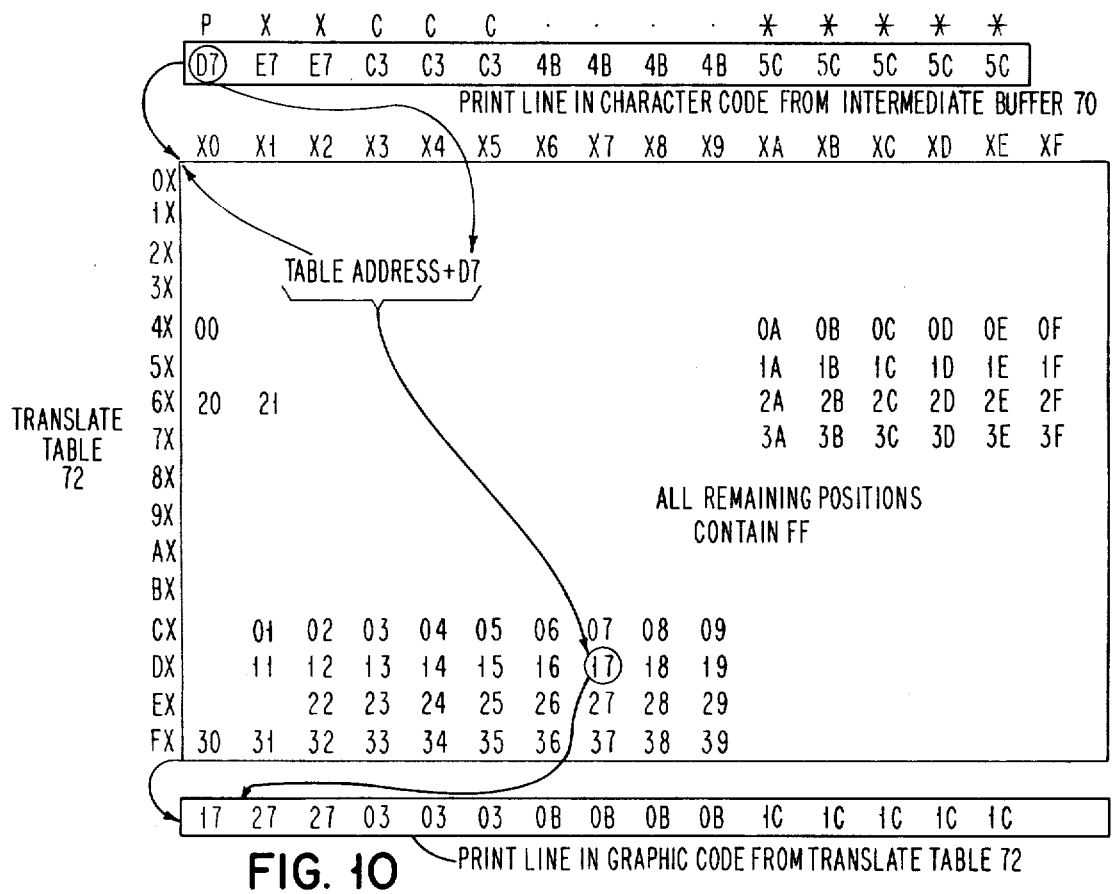
FIG. 10 is a graphical illustration of the manner in which a line of character code bytes is translated into graphic code bytes by the translate table.

The character code of the print line residing in the intermediate buffer 70 is translated by the translate table 72 into graphic code as shown in FIG. 10. The translation process involves five steps. Step 1 is to fetch a byte from the intermediate buffer 70. In Step 2 the fetched byte is added to the address of the translate table 72. In Step 3 the contents of the data at the resulting address within the translate table 72 are fetched. If the fetched data byte is a hexidecimal "FF", then an unprintable character error status is set and the graphic code is replaced by "00", in Step 4. In Step 5 the byte fetched from the translate table 72 is passed to the compression algorithm 76.

In the present example the first byte of the print line which is "D7" is fetched from the intermediate buffer 70 and is added to the address of the translate table 72. The resulting address points to "17" which is the byte in graphic code form. The succeeding character code bytes in the print line are fetched and translated in similar fashion until the entire print line is translated. The resultant print line in graphic code form is shown at the bottom of FIG. 10.

The graphic characters produced by the 64 different graphic code bytes stored in the translate table 72 are shown by the following table. The writable character generator modules 74 have a set of character image bits for each such graphic character, the set of character image bits being addressed by the corresponding graphic code byte in the manner previously described.

| Graphic Code | Graphic Character |
|---|---|
| 00 | blank |
| 01 | A |
| 02 | B |
| 03 | C |
| 04 | D |
| 05 | E |
| 06 | F |
| 07 | G |
| 08 | H |
| 09 | I |
| 0A | ¢ |
| 0B | . |
| 0C | < |
| 0D | ( |
| 0E | + |

-continued

| Graphic Code | Graphic Character |
|---|---|
| 0F | \| |
| 10 | & |
| 11 | J |
| 12 | K |
| 13 | L |
| 14 | M |
| 15 | N |
| 16 | O |
| 17 | P |
| 18 | Q |
| 19 | R |
| 1A | ! |
| 1B | $ |
| 1C | * |
| 1D | ) |
| 1E | ; |
| 1F | ¬ |
| 20 | - |
| 21 | / |
| 22 | S |
| 23 | T |
| 24 | U |
| 25 | V |
| 26 | W |
| 27 | X |
| 28 | Y |
| 29 | Z |
| 2A | : |
| 2B | , |
| 2C | % |
| 2D | _ |
| 2E | > |
| 2F | ? |
| 30 | 0 |
| 31 | 1 |
| 32 | 2 |
| 33 | 3 |
| 34 | 4 |
| 35 | 5 |
| 36 | 6 |
| 37 | 7 |
| 38 | 8 |
| 39 | 9 |
| 3A | : |
| 3B | # |
| 3C | @ |
| 3D | ' |
| 3E | = |
| 3F | " |

The graphic code bytes at the output of the translate table 72 are compressed using the compression algorithm 76. The compression algorithm 76 works on the translated graphic code bytes as they are placed into the page buffer 78. As the graphic code bytes are moved into the page buffer 78 the compression algorithm examines each byte and compares it to the previous byte. If they are equal, then a counter within the page buffer 78 is incremented. Since compression is accomplished for four or more identical bytes, a count of greater than three within the counter results in no more of the translated data being stored in the page buffer. Instead only the counter is incremented in response to each byte. When the bytes do not compare, the counter is examined. If a count of greater than 3 is stored in the counter, then the set of characters was compressed, and the compressed data sequence is then stored in the page buffer 78.

The compressed data sequence consists of three bytes. The first byte is a decompression identifier, which is the hexidecimal "FF". The second byte is the number of characters compressed, and the third byte is the character being compressed. The first three bytes of an identical character sequence will have already been stored in the page buffer 78. All that must be stored for the data compression sequence is the "FF" and the number of characters, as the third byte is already in the page buffer 78. Data compression will result in any four or more identical characters being stored by three bytes of data in the page buffer 78. After all the data in the intermediate buffer 70 has been moved into the page buffer 78, any remaining untransferred positions are padded out with blanks. A channel may not have transferred 204 characters, in which case, the remainng positions have to be supplied by the printer.

In the present example the character code byte "OB" appears in a sequence of four in the print line. When translated this becomes "FF 04 OB". Similarly the graphic code byte "1C" which appears in a sequence of 5 is compressed as "FF 05 1C".

The print line as compressed and stored in the page buffer 78 appears as "LC 17 27 27 03 03 03 FF 04 0B FF 05 1C". "LC" represents the line control character. There is a line control character for each line in the page buffer 78. For a compressed line, the line control character is "FF". For a blank line the line control character "FE" with the remainder of the line being empty or blank.

As noted earlier a buffer interloc scheme is used to prevent overfilling the page buffer 78. A check is made to ensure that there is room in the page buffer for each incoming print line. If room exists in the page buffer, a "device end status" condition is posted to the main channel 14. If room is not available, the control logic for the printer waits until room becomes available. When a page is printed out of the page buffer 78, this room is released and is made available for incoming data. The control logic detects that such room is available and presents a "device end status" condition. This condition initiates the main channel 14 to proceed to the next channel command word.

When the print line of the present example has advanced through the page buffer 78 and is ready to be loaded into one of the line buffers, 83, 84 for printing by the character generator 27, the decompression algorithm 81 is employed to decompress the data. When decompression is completed the graphic codes of the print line assume the same form as at the output of the translate table 72, namely "PXXCCC....*****".

As the decompressed print line is loaded into one of the line buffers 83, 84, copy modification is performed using the arrangement shown in FIG. 9. In the present example the modification data which is loaded into the buffer 82 consists of "01 01 08 01 06 02 21 21". The first byte "01" denotes the starting copy number. The second byte "01" is the number of copies to be modified. The third byte "08" is the line number where the modification is to begin. The fourth byte "01" is the number of lines to be modified. The fifth byte "06" is the print position within the line to be modified. The sixth byte "02" is the number of bytes in the text field. The last field "21 21" is the text data itself. The print line of the present example is assumed to be the eighth line of the copy to be modified. The sixth print position in the line is the third "C". Since the text length is two characters, the first"." is also to be modified. Accordingly the graphic codes "03" and "0B" corresponding to the third "C" and the first "." are replaced by the graphic codes "21". As so modified the graphic codes stored in the line buffer and awaiting printing consist of "17 27 27 03 03 21 21 0B 0B 0B 1C 1C 1C 1C 1C". The graphic code "21" corresponds to the graphic "/", and accordingly the graphics represented by the print line consist of "PXXCC//....*****".

Figure 11:
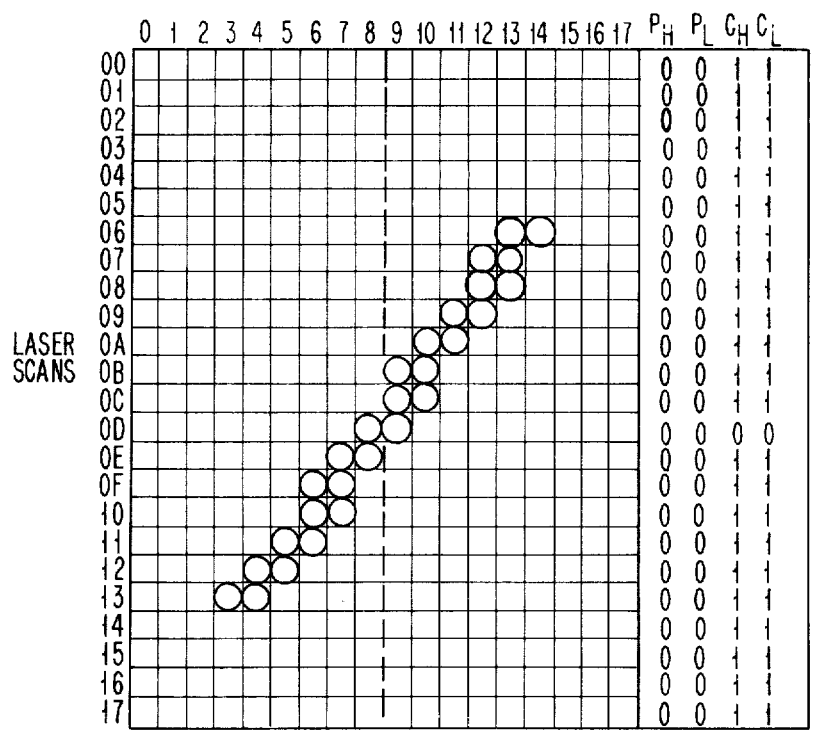
FIG. 11 is a graphical illustration of the manner in which character image bits are used to print a graphic character.

When it is time for the graphic codes stored in the line buffer to be printed, the graphic codes are used as addresses to locate the character image bits in the writable character generator modules 74 as previously described in connection with FIG. 6. As the writable character generator modules 74 are accessed, the character image bits in the form of sets of raster bits are obtained. These bits correspond to a horizontal slice of a graphic character. The bits are serialized and are used to modulate the laser beam to draw the graphic character. In the present example the particular bits used to print the graphic character "/" are illustrated in FIG. 11 together with the manner in which the bits are employed during the various scans to effect the printing. It will be noted that no printing occurs during the first 6 scans 00–05 or during the four scans 14–17. Each of the other scans 06–13 therebetween involves printing during two of the 18 bits. The result is the desired graphic character "/".

As described herein the printer utilizes the writable control storage 40 for setting up many of the functions to be performed under program control. It should be understood, however, that the resulting arrangement and the preceding discussion in connection therewith are presented by way of example only, and different approaches can be used For example most or all of the writable control storage 40 can be replaced by hardwired circuitry, thereby comprising a permanent implementation for the various functions to be performed.

While the invention has been particularly shown and described with reference to a preferred embodiment thereof, it will be understood by those skilled in the art that various changes in form and details may be made therein without departing from the spirit and scope of the invention.

What is claimed is:

1. A system for printing characters in response to coded data comprising:
    means for storing a plurality of different sets of graphical data, each set of graphical data being identified by a particular address and defining the portions of a grid pattern which a particular character comprises;
    means responsive to receipt of the coded data by the system for assembling the data into a group representing a plurality of characters to be printed;
    means responsive to assembly of the coded data into a group for translating each portion of the coded data representing a character into a corresponding address, the means for translating including means for storing addresses in a plurality of different storage locations and means responsive to the value of each portion of the coded data representing a character for selecting a storage location to provide the address stored therein;
    means responsive to each address from the means for translating for selecting the corresponding set of graphical data from the means for storing sets of graphical data corresponding to the address;
    grid pattern scanning print means; and
    means responsive to each selected set of graphical data for modulating the scanning print means in accordance with the graphical data to print a character.

2. The invention defined in claim 1, wherein the means for translating includes means for selectively changing the addresses stored in the different storage locations.

3. The invention defined in claim 1, wherein the means for translating includes means for translating a plurality of different selected portions of the coded data into the same address.

4. The invention defined in claim 1, further including means for storing modification data denoting desired changes in the group of coded data, and means responsive to storage of the modification data for changing selected addresses of the group of coded data in accordance with the modification data.

5. The invention defined in claim 1, wherein each of the different sets of graphical data comprises a plurality of modulation bits defining the portions of a character space which a particular character comprises, and the means for storing a plurality of different sets of graphical data includes means responsive to receipt of external signals for entering selected sets of graphical data represented by the external signals in the means for storing sets of graphical data.

6. The invention defined in claim 5, wherein the external signals include sets of graphical data and coded signals defining locations within the means for storing sets of graphical data, and the means for entering selected sets of graphical data includes means responsive to the coded signals for determining each desired location within the means for storing sets of graphical data and means for entering a set of graphical data in the desired location.

7. A system for printing characters in response to units of coded data comprising:
intermediate buffer means responsive to receipt of the units of coded data by the system for assembling the units of coded data into successive lines of characters to be printed on a page;
translate table means including a plurality of different storage locations within a storage means, each storing a different one of a plurality of units of address data, each unit of address data corresponding to a particular character which the system is capable of printing, and means responsive to each unit of coded data assembled into successive lines in the intermediate buffer means for selecting one of the plurality of different storage locations in accordance with the value of the coded data of the unit;
page buffer means responsive to the translate table means for assembling the units of address data stored in the selected storage locations into successive pages of characters to be printed;
character generator module means including means for storing a plurality of units of graphical data, each unit of graphical data comprising a plurality of data bits identifying the portions of a given print area which a particular character comprises;
means responsive to each unit of address data in the page buffer means for selecting a corresponding unit of graphical data within the character generator module means; and
means responsive to each selected unit of graphical data for printing the portions of a given print area identified by the data bits of the units of graphical data on a printable medium.

8. The invention defined in claim 7, wherein the means for selecting one of the plurality of different storage locations includes an initial address, means for adding each unit of coded data to the initial address to determine the resulting sum and means for selecting one of the plurality of different storage locations in accordance with the sum.

9. The invention defined in claim 7, further including means coupled to the character generator module means and responsive to receipt of external signals for identifying a selected location within the character generator module means in accordance with the external signals and means responsive to receipt of the external signals for entering a unit of graphical data in the selected location within the character generator module means in accordance with the external signals.

10. The invention defined in claim 7, wherein the translate table means has reserve code data stored in some of the different storage locations, and further including means for providing an error indication whenever the means for selecting selects a storage location having reserve code data stored therein.

11. The invention defined in claim 7, further including modification data buffer means for storing modification data defining modifications in copies of a form page in the page buffer means, and means coupled to the modification data buffer means and responsive to the selected units of address data in the page buffer means for altering the selected units of address data in accordance with the modification data, and wherein the means for selecting a corresponding unit of graphical data within the character generator module means is responsive to the selected units of address data as altered in accordance with the modification data.

12. The invention defined in claim 11, wherein the modification data includes identifying data denoting the location of each modification in terms of copy number, line number and print position within a line, and the means for altering selected units of address data compares the identifying data with data identifying the copy and line being printed to determine which of the selected units of address data are to be altered.

13. A system comprising the combination of:
a data processing unit;
a printer system; and
a channel coupling the printer system to the data processing unit;
said data processing unit including means for communicating coded data representing characters to be printed over said channel; and
said printer system including means responsive to communication of the coded data over said channel for translating the coded data into addresses, said translating means including a plurality of storage locations having addresses stored therein, means for selecting storage locations in accordance with the values of the coded data and means for reading out the addresses stored in storage locations selected by the means for selecting, means responsive to each address for providing data representing the graphical layout of a particular character, said means for providing data representing the graphical layout of a particular character including storage means having the data stored therein, the data being chosen in accordance with the addresses read out by the means for translating, and means responsive to chosen data representing the graphical layout of a particular character for printing the character on a medium.

14. The invention defined in claim 13, wherein the data processing unit includes means for communicating data representing the graphical layout of particular characters to be stored in defined locations within the storage means, and the means for providing data representing the graphical layout of a particular character includes means responsive to communication of data representing the graphical layout of particular characters over said channel for storing the data in said defined locations within the storage means as new data, the new data replacing any data previously stored in the defined portions of the storage means.

15. The invention defined in claim 14, wherein the means for providing data representing the graphical layout of a particular character includes a plurality of different storage means having the data stored therein.

16. The invention defined in claim 15, wherein the data representing the graphical layout of particular characters communicated over said channel includes data identifying the particular storage means and the location therein in which each portion of data representing the graphical layout of a particular character is to be stored.

17. The invention defined in claim 13, wherein the data processing unit includes means for communicating data representing addresses to be stored in specified ones of said storage locations over said channel, and said means for translating the coded data into addresses further includes means responsive to receipt of data representing addresses to be stored in said storage locations communicated over said channel for storing new addresses represented by the data in the specified ones of said storage locations, the new addresses replacing any addresses previously stored in the specified ones of said storage locations.

18. The invention defined in claim 17, wherein the means for translating the coded data includes means for adding portions of the coded data to an initial address for the storage locations to provide a plurality of sums, and means for selecting one of the storage locations represented by each sum to thereby select and output an address.

19. A system comprising the combination of:
a data processing unit;
a printer system; and
a channel coupling the printer system to the data processing unit;
said data processing unit including means for communicating coded data representing characters to be printed over said channel and means for communicating information representing sets of character image data over said channel; and
said printer system including means for storing a plurality of character image data sets, means for storing addresses, means responsive to communication of the coded data over the channel for selecting addresses in accordance with values of the coded data, means responsive to the selected addresses for selecting character image data sets within the means for storing in accordance with values of the addresses, means responsive to the selection of each character image data set for printing a character, means responsive to communication of the information representing character image data sets over said channel for applying part of the information to the means for storing addresses to provide for selection of addresses, and means responsive to communication of the information and to the selection of addresses for storing new character image data sets represented by the information in specified locations in said means for storing determined by the selected addresses, the new character image data sets replacing any character image data sets previously stored in the specified locations.

20. The invention defined in claim 19, wherein said printer system includes a plurality of different means for storing character image data sets, said information representing character image data sets comprises a succession of pairs of fields, the first field of each pair identifying the particular means for storing and the location therein in which a character image data set represented by the second field of the pair is to be stored, the first field comprising said part of the information which is applied to the means for storing addresses, and the printer system includes means responsive to the first field of each pair for locating the means for storing identified by the field, and means responsive to the second field of each pair for converting and reformating the second field to provide the character image data set for storage in the means for storing identified by the first field.

21. The invention defined in claim 21, wherein the means for selecting character image data sets within the means for storing in accordance with characters represented by the coded data includes means for translating the coded data into addresses of particular locations within particular ones of the means for storing character image data sets, and the means responsive to the first field of each pair for locating the means for storing and the location therein identified by the field includes means for applying the first field to the means for translating.

22. A printer system comprising the combination of:
storage table means having a plurality of storage locations therein, each storage location being capable of storing a graphic code byte;
translate means responsive to each of a succession of character code bytes provided the printer system for selecting a particular storage location within the storage table means in accordance with the value of the character code byte, each character code byte representing a character to be printed;
character generator module means having a plurality of storage locations therein, each storage location being capable of storing a set of graphic character bits and being identified by a different one of the graphic code bytes;
means responsive to the graphic code bytes within each storage location of the storage table means selected by the translate means for selecting the storage location within the character generator module means identified by the graphic code byte;
printing means including means for scanning a printable surface and modulator means for modulating the scanning means in accordance with an input thereto to print selected portions of the printable surface and thereby create a character; and
means responsive to each selection of a storage location of the character generator module means by the means for selecting for applying the set of graphic character bits within the selected storage location as an input to the means for modulating the scanning means.

23. The invention defined in claim 22, wherein there are plural character generator module means, and each graphic code byte identifies both a selected character generator module means and a selected storage location within the selected character generator module means.

24. The invention defined in claim 23, further including means responsive to each of a succession of graphic character words provided the printer system for storing a corresponding set of graphic character bits at a selected storage location within a selected one of the character generator module means, each of said graphic character words comprising a character address and character image data, the character address identifying both a selected character generator module means and a selected storage location therein, said means for storing a corresponding set of graphic character bits including means responsive to the character image data of each graphic character word for converting the character image data into a set of graphic character bits and means responsive to the character address of the graphic character word for storing the set of graphic character bits at the selected storage location within the selected character generator module means identified by the address.

25. The invention defined in claim 22, wherein the character code bytes are provided to the printer, one line of characters at a time, and further including intermediate buffer means coupled to receive the character code bytes and assemble said bytes into a line prior to selection of a storage location by the translate means in response to each character code byte.

26. The invention defined in claim 25, further including compression means responsive to each graphic code byte within each storage location of the storage table means selected by the translate means for compressing the data of the graphic code byte into a shortened format, page buffer means coupled to receive and assemble the compressed graphic code bytes into at least a page of characters, and decompression means for decompressing the data of each graphic code byte in the page buffer means into the original format prior to being applied to the means for selecting the storage location within the character generator module means identified thereby.

27. A system for printing characters in response to character code bytes, each character code byte representing a different character to be printed, comprising:
    means for providing character code bytes;
    translate table means include data storage means having a plurality of storage locations therein, at least some of the storage locations containing graphic code bytes, said data storage means having an initial address and including means for adding each character code byte to the initial address to determine the resulting sum, means for selecting a storage location within the data storage means in accordance with the resulting sum, and means for reading out the graphic code byte stored in each storage location selected by the means for selecting;
    character generator module means for storing a plurality of sets of character image bits therein;
    means responsive to each graphic code byte read out for selecting a set of character image bits in the character generator module means; and
    means responsive to each set of character image bits selected by the means for selecting for printing a character corresponding to the set of character image bits.

28. The invention defined in claim 27, further including means for loading desired graphic code bytes in selected storage locations in the translate table means.

29. The invention defined in claim 27, wherein at least some of the storage locations of the translate table means contain reserve code bytes, and further including means for indicating selection of an unprintable character whenever a storage location containing a reserve code byte is selected by the means for selecting.

30. The invention defined in claim 27, further including means for loading the same graphic code byte in a plurality of storage locations in the translate table means, whereby different graphic code bytes cause selection of the same graphic code byte to print the same character.

31. A system comprising the combination of:
    a data processing unit;
    a printer system; and
    a channel coupling the printer system to the data processing unit;
    said data processing unit including means for communicating coded data representing characters to be printed and modification data representing changes; and
    said printer system including means for assembling the communicated coded data in storage means into at least one physical arrangement defining a form, means for storing the communicated modification data in the storage means, means responsive to the modification data for sensing the coded data in the storage means to repetitively print the characters represented by the coded data in the form a selected number of times as determined by the modification data, means responsive to the repetitive printing for providing a indication of the location within the form where the characters represented by the coded data are being printed, and means responsive to the modification data and to the indication of location within the form for changing the coded data in the form in accordance with the modification data as the means for printing senses the coded data in the storage means and prints the characters represented thereby.

32. The invention defined in claim 31, wherein said means for communicating coded data is operative to communicate the coded data physically arranged to define a single page together with modification data representing changes in a plurality of different copies of the page to the printer system, and wherein the printer system is operative to successively change and print the characters represented by the coded data of the page in accordance with the modification data for each different copy of the page.

33. The invention defined in claim 31, wherein said means for communicating coded data is operative to repetitively communicate the coded data physically arranged to define a plurality of different pages together with modification data representing changes in a different copy of the pages to the printer system.

34. In a system in which data representing characters to be printed is assembled into a physical format defining a form in buffer means and thereafter used in print means to print the characters represented by the data in the form, an arrangement for providing printing of multiple copies of the characters represented by the data of the form with changes in the copies being made in accordance with modification data, said modification data including identifying data defining the locations within the physical format defining the form where modifications in the data are to be made, comprising buffer means, means for storing the modification data in the buffer means, print means for sensing the data in predetermined order as stored in the buffer means and printing the characters represented thereby, means providing an indication of the location within the form where data is being sensed and printed by the print means, means for comparing the identifying data with the indication of the location to provide an indication when modifications are to be made, and means responsive to each indication for modifying the data of the physical format defining the form in accordance with the modification data as the data is being sensed by the print means.

35. The invention defined in claim 34, wherein the identifying data includes indications of copy number, number of copies, line number, number of lines and print position of the locations within the copies of the character represented by the data where modifications are to be made.

36. The invention defined in claim 35, wherein the means for comparing comprises first comparator means for comparing the indications of copy number and number of copies with the number of the copy being printed by the print means, and second comparator means for comparing the indications of line number and number of lines with the line being printed by the print means.

* * * * *

UNITED STATES PATENT AND TRADEMARK OFFICE
CERTIFICATE OF CORRECTION

PATENT NO. : 4,031,519
DATED : June 21, 1977
INVENTOR(S) : Gerald I. Findley

It is certified that error appears in the above-identified patent and that said Letters Patent are hereby corrected as shown below:

Column 30, line 23, "21" should read --20--.

Column 31, line 47, "include" should read --including--.

Column 34, line 5, "character" should read --characters--.

Signed and Sealed this

Thirteenth Day of September 1977

[SEAL]

Attest:

RUTH C. MASON
*Attesting Officer*

LUTRELLE F. PARKER
*Acting Commissioner of Patents and Trademarks*